(12) United States Patent
Nagata et al.

(10) Patent No.: US 6,354,528 B1
(45) Date of Patent: Mar. 12, 2002

(54) WEBBING RETRACTOR

(75) Inventors: Tomonori Nagata; Seiji Hori; Akira Sumiyashiki; Katsuki Asagiri, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/503,720

(22) Filed: Feb. 14, 2000

(30) Foreign Application Priority Data

Feb. 16, 1999 (JP) .......................... 11-037090
Apr. 20, 1999 (JP) .......................... 11-112138
May 7, 1999 (JP) .......................... 11-127050

(51) Int. Cl.$^7$ .............................................. B65H 75/48
(52) U.S. Cl. ................. 242/374; 242/379.1; 242/383.2; 242/383.5
(58) Field of Search ............................ 242/374, 379.1, 242/383.2, 383.5, 384.6; 280/806; 297/478

(56) References Cited

U.S. PATENT DOCUMENTS

| | | | |
|---|---|---|---|
| 5,390,873 A | * 2/1995 | Fujimura et al. | 242/383.2 |
| 5,482,224 A | * 1/1996 | Fujimura et al. | 242/376 |
| 5,553,890 A | 9/1996 | Buhr et al. | |
| 5,699,976 A | * 12/1997 | Hori | 242/374 |
| 5,772,144 A | * 6/1998 | Tanabe et al. | 242/379.1 |
| 5,794,876 A | * 8/1998 | Morizane et al. | 242/374 |
| 5,794,877 A | 8/1998 | Ono et al. | |
| 5,842,344 A | * 12/1998 | Schmid | 60/632 |
| 5,984,223 A | * 11/1999 | Hiramatsu | 242/379.1 |
| 6,068,208 A | * 5/2000 | Matsuki et al. | 242/383.2 |
| 6,105,893 A | * 8/2000 | Schmidt et al. | 242/374 |
| 6,113,022 A | * 9/2000 | Ono et al. | 242/379.1 |
| 6,152,391 A | * 11/2000 | Nagata et al. | 242/374 |
| 6,227,478 B1 | * 5/2001 | Hudelmaier et al. | 242/374 |

FOREIGN PATENT DOCUMENTS

| | | | |
|---|---|---|---|
| JP | 05-246303 | | 9/1993 |
| JP | 10-119719 | | 5/1998 |
| JP | 11-059330 | | 3/1999 |
| JP | 11-247906 A | * | 9/1999 |

* cited by examiner

*Primary Examiner*—Donald P. Walsh
*Assistant Examiner*—Daniel K Schlak
(74) *Attorney, Agent, or Firm*—Nixon Peabody LLP; Thomas W. Cole

(57) ABSTRACT

An inexpensive webbing retractor is obtained by making a pretensioner and a lock device small and reducing the number of parts. A plurality of protrusions are formed on an inner peripheral portion of the bearing body, which pivotally supports a clutch portion. These protrusions are brought into linear contact with an outer peripheral portion of the clutch portion, whereby the bearing body pivotally supports the clutch portion indirectly via the protrusions. Since the protrusions are brought into linear contact with the clutch portion, the contact area becomes quite small. Hence, the protrusions are easily plastically deformed due to friction resistance with the clutch portion. Therefore, resistance that obstructs the rotation of the clutch portion becomes small, and gas pressure can be efficiently supplied for the rotation of a take-up shaft. Also disclosed is a locking device comprising a lock base attached to the winding spool, a lock plate for engagement with ratchet teeth of a frame, and a lock cover which comprises a hook portion with which the lock base is engaged, and an outer peripheral flange portion overlapping the frame.

24 Claims, 30 Drawing Sheets

FIG. 12
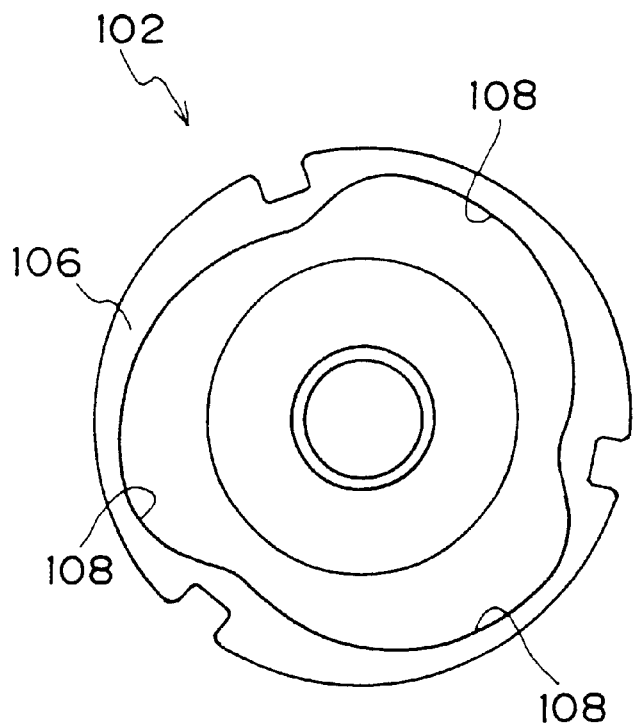
FIG. 13A    FIG. 13B
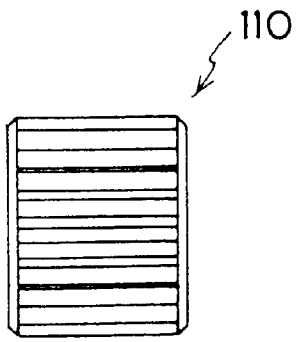
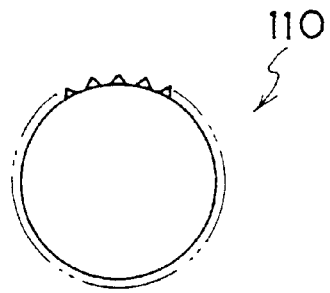

F I G. 29
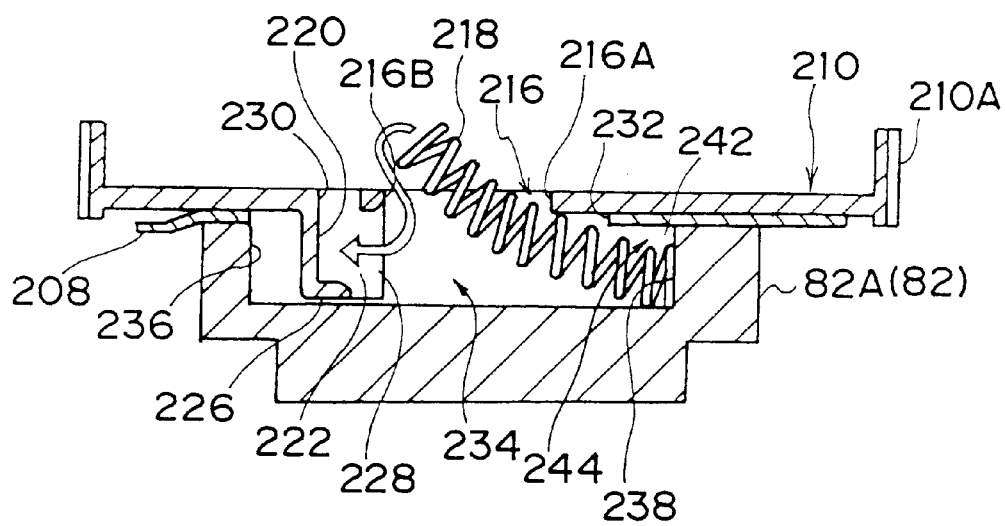

WEBBING RETRACTOR

BACKGROUND OF THE INVENTION

1. Field of the Invention

The present invention relates to a webbing retractor in a seat belt system for restraining an occupant in a vehicle with a webbing belt.

2. Description of the Related Art

A webbing retractor constituting a main part of a so-called seat belt system for restraining an occupant in a vehicle with an elongated belt-shaped webbing belt basically comprises: a take-up shaft with which one end of the webbing belt is engaged; a frame for supporting the take-up shaft; and urging means such as a spiral coil spring or the like, for urging the take-up shaft in the direction of winding the webbing belt.

In addition to the above structure, an ordinary webbing retractor is provided with a lock device for locking the take-up shaft when a vehicle enters an abrupt deceleration state, to thereby resist a force of an occupant's body, which moves toward the front of the vehicle due to inertia in the abrupt deceleration state, acting to pull out the webbing belt, and for improving the restraining force of the webbing belt; and a pretensioner for forcibly imparting rotation force in the take-up direction to the take-up shaft in the abrupt deceleration state of the vehicle.

Since the above-described conventional webbing retractor has a large number of parts to be used, the apparatus becomes large as a whole. Below is a detailed description of the above-described lock device and pretensioner.

The lock device ordinarily comprises a substantially circular V gear having ratchet teeth formed on the outer peripheral portion thereof. The V gear is mechanically connected to the take-up shaft via a torsion spring or the like, and follows the take-up shaft for rotation. A pair of lock plates are held by engagement on the side along the V gear and the take-up shaft, and when relative rotation is caused between the take-up shaft and the V gear, each lock plate moves outward in the radial direction of rotation of the take-up shaft. Each lock plate is formed with ratchet teeth, and when moved outward in the radial direction of rotation of the take-up shaft, meshes with the internal teeth of the ratchet hole formed in one of a pair of leg plates constituting a frame. Moreover, an acceleration sensor having an inertia ball is disposed in the direction that is outward in the radial direction with respect to the V gear (ordinarily, on the lower side). Due to the inertia ball rolling at the time of abrupt deceleration of the vehicle, an engagement pawl of the acceleration sensor engages with the ratchet teeth to restrict the rotation of the V gear. That is, during the abrupt deceleration state of the vehicle, the occupant's body tends to move in the direction the vehicle is travelling due to inertia. At this time, the occupant's body pulls out the webbing belt to rotate the take-up shaft. But since the V gear is locked by the engagement paw, a relative rotation is caused between the take-up shaft and the V gear, and each lock plate moves outward in the radial direction of rotation of the take-up shaft, and the ratchet teeth of each lock plate meshes with the internal teeth of the ratchet hole to restrict the rotation of the take-up shaft.

With such a conventional lock device, two (a pair of) lock plates are used to obtain mechanical strength sufficient for corresponding to rotation of the take-up shaft in the abrupt deceleration state of the vehicle, which is one factor leading to an increase in the number of parts.

On the other hand, the pretensioner comprises a pinion connected to one end of the take-up shaft via a one-way clutch, and a rack bar meshable with the pinion. The rack bar is formed integrally with a piston housed in a cylinder, moves with increase in the internal pressure of the cylinder to thereby mesh with the pinion and forcibly rotates the take-up shaft in the take-up direction via the one-way clutch. A gas generator is attached to the cylinder, which ignites a gas generating agent in the gas generator when an acceleration sensor other than the acceleration sensor of the above-described lock device detects the abrupt deceleration state of the vehicle to thereby generate gas instantaneously, and to move the piston by gas pressure.

The take-up shaft-side shaft portion of the above-described pinion or the pinion-side shaft portion of the one-way clutch is ordinarily rotatably supported by means of a bearing portion provided in the housing formed by a metal plate or the like, the bearing portion being brought into face contact with the outer peripheral face along the outer peripheral direction of the shaft portion. Therefore, for example, when the rack bar meshes with the pinion, the take-up shaft becomes eccentric, and in this state, when the take-up shaft is made to rotate, the take-up shaft rotates in the state of being pressed against the inner peripheral portion of the bearing. Hence, the friction resistance becomes large. By this friction resistance, the force by which the pretensioner forcibly rotates the take-up shaft via the rack bar and the pinion is converted into heat energy, hence the portion of the force actually leading to rotation of the take-up shaft decreases. Particularly, when synthetic resin material having a lower rigidity than the metal material forming the take-up shaft is used for the bearing portion so as to decrease the weight, an inner peripheral portion of the bearing portion is plastically deformed due to the above-described friction resistance. Hence, the inner peripheral face of the bearing portion becomes rough, to thereby further increase the friction resistance.

As described above, with the webbing retractor provided with a conventional pretensioner, the decrease of force rotating the take-up shaft of the pretensioner due to the friction resistance must be taken into consideration in advance, and the quantity of the gas to be generated should be increased for that amount. Therefore, the pretensioner is made large, and the webbing retractor increases in size accordingly.

In view of the above circumstances, it is an object of the present invention to obtain an inexpensive webbing retractor by making the pretensioner and the lock device small and reducing the number of parts.

SUMMARY OF THE INVENTION

To attain the above object, a first aspect of the present invention is a webbing retractor for use with a webbing belt having opposite ends, the webbing retractor comprising a cylindrical take-up shaft at which one end of a webbing belt is retained a lock device for restricting rotation of the take-up shaft in a direction for pulling out the webbing belt, during abrupt deceleration of a vehicle and a pretensioner for forcibly rotating the take-up shaft in the take-up direction opposite to the pulling-out direction during abrupt deceleration of the vehicle wherein the lock device includes a frame having a pair of leg plates opposite to each other along an axial direction of the take-up shaft, one of the pair of leg plates being formed with a ratchet hole whose inner peripheral portion serves as internal ratchet teeth, the leg plates having sides, a lock base provided coaxially and relatively rotatable with respect to the take-up shaft, in a vicinity of the one of the pair of leg plates a lock plate having external teeth meshable with the ratchet teeth, which is substantially integrally held by the lock base, and which restricts rotation of the lock base in the pulling-out direction by meshing of the external teeth with the ratchet teeth a torsion shaft having opposite ends, provided in the take-up shaft coaxially with the take-up shaft, one end of the torsion shaft being coupled to the take-up shaft, the other end being coupled to the lock base, for integrally rotating the take-up shaft and the lock base, and allowing rotation of the take-up shaft relative to the lock base due to torsion deformation of the torsion shaft, and a lock cover formed with a push nut portion with which a distal end portion of the torsion shaft is engaged, a hook portion with which the lock base is engaged, and an outer peripheral flange portion overlapping the frame, for pinching the one leg plate between one end portion of the take-up shaft and the lock cover and covering the lock base and the lock plate, and wherein the pretensioner includes a pinion provided coaxially with respect to the take-up shaft at the side of the other leg plate of the pair of leg plates and coupled directly or indirectly to the take-up shaft, a piston having an end portion, on which a rack bar meshable with the pinion is formed in an axial direction, a cylinder having a bottom portion and an end opening in an axial direction of the piston serves, for housing the piston and driving the piston with increase in internal pressure a gas generator for supplying gas between the bottom portion of the cylinder and the piston during abrupt deceleration of the vehicle a bearing portion facing an outer peripheral portion of a shaft portion provided coaxially with the pinion on the take-up shaft side of the pinion in a radial direction of the pinion, and having an inner peripheral portion such that a predetermined gap exists between the outer peripheral portion of the shaft portion and the inner peripheral portion, and a plurality of protrusions which are formed to protrude from one having a lower rigidity towards the other having a higher rigidity, of the inner peripheral portion of the bearing portion and the outer peripheral portion of the shaft portion, to thereby be brought into contact with the one having the higher rigidity, the webbing retractor further including an acceleration sensor for detecting a change in acceleration during abrupt deceleration of the vehicle, and for causing the external teeth of the lock plate to mesh with the internal ratchet teeth, upon detection of the change in acceleration and urging means provided at the side of the other leg plate of the frame, for urging the take-up shaft in the rotational direction for taking up the webbing belt.

A second aspect of the present invention is the webbing retractor according to the first aspect, wherein the pretensioner includes a cover for covering the pinion and the rack bar from a side opposite the other leg plate with respect to the pinion and the rack bar, the cover being formed with a bearing hole for pivotally supporting the pinion, a stopper facing the rack bar at the side in the driving direction of the piston due to increase in the internal pressure of the cylinder, and a restricting portion at the side opposite to the pinion with respect to the rack bar, wherein a peripheral portion of the bearing hole, the stopper and the restricting portion of the cover are formed of metal, and the remaining portion of the cover is formed of synthetic resin material.

A third aspect of the present invention is the webbing retractor according to the second aspect, wherein the protrusions are formed on the bearing portion, and the protrusions formed in a vicinity of a portion facing the shaft portion along a pressing direction of the rack bar against the pinion are more numerous in number than the protrusions formed in another portion of the bearing portion.

A fourth aspect of the present invention is the webbing retractor according to the third aspect, wherein the protrusions are brought into linear contact with one of the inner peripheral portion of the bearing portion and the outer peripheral portion of the shaft portion, with one of these being without the protrusions formed thereon.

A fifth aspect of the present invention is the webbing retractor according to the fourth aspect, wherein the lock device includes a V gear provided coaxially and relatively rotatable with respect to the lock base, meshing with the lock plate, which displaces the lock plate by relative rotation to thereby cause the external teeth to mesh with the ratchet teeth wherein the acceleration sensor includes an inertial mass body which moves due to change in acceleration during abrupt deceleration of the vehicle and a restriction member which is displaced according to movement of the inertial mass body and is engaged with the V gear due to the displacement, to thereby restrict rotation of the V gear.

A sixth aspect of the present invention is the webbing retractor according to the fifth aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

A seventh aspect of the present invention is the webbing retractor according to the second aspect, wherein the protrusion is formed in the bearing portion, in the opposite side of the rack bar with respect to the pinion, and on the inner peripheral portion of the bearing portion facing the outer peripheral portion of the shaft portion along the direction of the meshing face of the rack bar and the pinion.

An eighth aspect of the present invention is the webbing retractor according to the seventh aspect, wherein the protrusions are brought into linear contact with one of the inner peripheral portion of the bearing portion and the outer peripheral portion of the shaft portion, with one of these being without the protrusions formed thereon.

A ninth aspect of the present invention is the webbing retractor according to the eighth aspect, wherein the lock device includes a V gear provided coaxially and relatively rotatable with respect to the lock base, meshing with the lock plate, which displaces the lock plate by relative rotation to thereby cause the external teeth to mesh with the ratchet teeth; wherein the acceleration sensor includes an inertial mass body which moves due to change in acceleration during abrupt deceleration of the vehicle and a restriction member which is displaced according to movement of the inertial mass body and is engaged with the V gear due to the displacement, to thereby restrict rotation of the V gear.

A tenth aspect of the present invention is the webbing retractor according to the ninth aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

An eleventh aspect of the present invention is the webbing retractor according to the first aspect, wherein the protrusions are formed on the bearing portion, and the protrusions formed in a vicinity of a portion facing the shaft portion along a pressing direction of the rack bar against the pinion are more numerous in number than the protrusions formed in another portion of the bearing portion.

A twelfth aspect of the present invention is the webbing retractor according to the eleventh aspect, wherein the protrusions are brought into linear contact with one of the inner peripheral portion of the bearing portion and the outer peripheral portion of the shaft portion, with one of these being without the protrusions formed thereon.

A thirteenth aspect of the present invention is the webbing retractor according to the twelfth aspect, wherein the lock device includes a V gear provided coaxially and relatively rotatable with respect to the lock base, meshing with the lock plate, which displaces the lock plate by relative rotation to thereby cause the external teeth to mesh with the ratchet teeth wherein the acceleration sensor includes an inertial mass body which moves due to change in acceleration during abrupt deceleration of the vehicle and a restriction member which is displaced according to movement of the inertial mass body and is engaged with the V gear due to the displacement, to thereby restrict rotation of the V gear.

A fourteenth aspect of the present invention is the webbing retractor according to the thirteenth aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

A fifteenth aspect of the present invention is the webbing retractor according to the first aspect, wherein the protrusion is formed in the bearing portion, in the opposite side of the rack bar with respect to the pinion, and on the inner peripheral portion of the bearing portion facing the outer peripheral portion of the shaft portion along the direction of the meshing face of the rack bar and the pinion.

A sixteenth aspect of the present invention is the webbing retractor according to the fifteenth aspect, wherein the protrusions are brought into linear contact with one of the inner peripheral portion of the bearing portion and the outer peripheral portion of the shaft portion, with one of these being without the protrusions formed thereon.

A seventeenth aspect of the present invention is the webbing retractor according to the sixteenth aspect, wherein the lock device includes a V gear provided coaxially and relatively rotatable with respect to the lock base, meshing with the lock plate, which displaces the lock plate by relative rotation to thereby cause the external teeth to mesh with the ratchet teeth wherein the acceleration sensor includes an inertial mass body which moves due to change in acceleration during abrupt deceleration of the vehicle and a restriction member which is displaced according to movement of the inertial mass body and is engaged with the V gear due to the displacement, to thereby restrict rotation of the V gear.

An eighteenth aspect of the present invention is the webbing retractor according to the seventeenth aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

A nineteenth aspect of the present invention is the webbing retractor according to the first aspect, wherein the protrusions are brought into linear contact with one of the inner peripheral portion of the bearing portion and the outer peripheral portion of the shaft portion, with one of these being without the protrusions formed thereon.

A twentieth aspect of the present invention is the webbing retractor according to the nineteenth aspect, wherein the lock device includes a V gear provided coaxially and relatively rotatable with respect to the lock base, meshing with the lock plate, which displaces the lock plate by relative rotation to thereby cause the external teeth to mesh with the ratchet teeth wherein the acceleration sensor includes an inertial mass body which moves due to change in acceleration during abrupt deceleration of the vehicle and a restriction member which is displaced according to movement of the inertial mass body and is engaged with the V gear due to the displacement, to thereby restrict rotation of the V gear.

A twenty-first aspect of the present invention is the webbing retractor according to the twentieth aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

A twenty-second aspect of the present invention is the webbing retractor according to the first aspect, wherein the lock device includes a V gear provided coaxially and relatively rotatable with respect to the lock base, meshing with the lock plate, which displaces the lock plate by relative rotation to thereby cause the external teeth to mesh with the ratchet teeth wherein the acceleration sensor includes an inertial mass body which moves due to change in acceleration during abrupt deceleration of t he vehicle and a restriction member which is displaced according to movement of the inertial mass body and is engaged with the V gear due to the displacement, to thereby restrict rotation of the V gear.

A twenty-third aspect of the present invention is the webbing retractor according to the Twenty-second aspect, wherein the urging means includes a spiral coil spring having opposite ends, with one end engaged directly or indirectly with the take-up shaft and the other end directly or indirectly engaged with the other leg plate of the frame, and urging the take-up shaft in a rotational direction for taking up the webbing belt due to rotation of the other end of the spring with respect to the one end of the spring in the direction of increasing the number of windings.

A twenty-fourth aspect of the present invention is the webbing retractor according to the first aspect, wherein the urging means includes a spiral coil spring having opposite ends, with one end engaged directly or indirectly with the take-up shaft and the other end directly or indirectly engaged with the other leg plate of the frame, and urging the take-up shaft a rotational direction for taking up the webbing belt due to rotation of the other end of the spring with respect to the one end of the spring in the direction of increasing the number of windings.

According to the webbing retractor of the first aspect of the present invention, the take-up shaft and the lock base are connected via the torsion shaft, and the take-up shaft is urged in the direction of winding the webbing belt by means of the urging force of the urging means. By rotating the take-up shaft, the lock base and the torsion shaft are rotated integrally in the pulling-out direction opposite to the take-up direction against the urging force, and the webbing belt can be pulled out.

On the other hand, at the time of abrupt deceleration of the vehicle, the change in the acceleration (deceleration) at this time is detected by the acceleration sensor, and the lock device operates. That is, when the acceleration sensor detects a change in the acceleration (deceleration) at the time of abrupt deceleration of the vehicle, the acceleration sensor meshes the external teeth of the lock plate with the internal ratchet teeth formed on the one leg plate of the frame. Thereby, the rotation in the pulling-out direction of the lock base is resisted. At this time, the webbing tensioning force works as a rotation force on the torsion shaft via the take-up shaft in the pulling-out direction. Thereby, the torsion shaft is distorted, and the take-up shaft is rotated in the pulling-out direction of the webbing with respect to the lock base to pull out the webbing. Hence, an energy of tensioning the webbing is absorbed.

Here, since the distal end portion of the torsion shaft is engaged with the push nut of the lock cover, pulling out of the torsion shaft is prevented. Moreover, since the lock base is engaged with the lock cover by means of the hook portion, the lock plate held by the lock base is substantially covered with the lock cover. Thereby, rising of the lock plate is prevented. Furthermore, since the outer peripheral flange portion of the lock cover is superposed on the frame, dust and the like are prevented from coming into the mechanism.

Moreover, since the lock base and the lock plate are covered in a state in which the frame is put between the lock cover and the take-up shaft, the shaft portion comprising the lock base, the lock plate, the take-up shaft and the distal end portion of the torsion shaft is prevented from dropping out from the frame.

As described above, the webbing retractor according to the first aspect of the present invention can realize prevention of rising of the lock plate in order to resist the rotation in the direction of pulling out, the webbing, and prevention of the torsion shaft from coming off, which can absorb the energy at the time of resisting the pulling out of the webbing, by providing a single lock cover. Hence, the number of parts can be reduced and special processing of parts is not necessary. Moreover, dust and the like can be prevented from coming into the mechanism.

On the other hand, the pretensioner operates in the abrupt deceleration state of the vehicle described above. That is, at the time of abrupt deceleration state of the vehicle, the gas generator operates to supply gas to between the piston and the bottom portion of the cylinder, and the internal pressure of the cylinder rises due to this gas pressure to push out the piston. Thereby, the rack bar integral with the piston meshes with the pinion to thereby rotate the pinion. Hence, the take-up shaft is forcibly rotated in the take-up direction for taking up the webbing belt. Thereby, the force for restraining the occupant's body by means of the webbing belt increases.

Here, in the present invention, the plurality of protrusions are formed projecting from the one having lower rigidity toward the other having higher rigidity, of the bearing portion or the shaft portion, along the rotation radius of the pinion, and the distal end portions of these protrusions are brought into contact with the one having the higher rigidity. That is, in the present invention, the shaft portion is pivotally supported by the bearing portion via the protrusions.

If an external force is applied to the shaft portion in the direction along the radial direction of the shaft portion in a state in which the shaft portion is rotating, the shaft portion becomes eccentric. Thereby, the gap between the inner peripheral portion of the bearing portion and the outer peripheral portion of the take-up shaft is narrowed in the above-mentioned displaced direction. At this time, the above-mentioned one having the higher rigidity tends to press the protrusions to deform them while relatively rotating toward the other having the lower rigidity. However, the portion of the protrusions contacting the one having the higher rigidity is extremely small compared to the area of the one having the higher rigidity on the side facing the one having the lower rigidity. Hence, the pressing force concentrates on the protrusions, and the protrusions are thereby easily plastically deformed. In this manner, since the protrusions are easily plastically deformed, the resistance of the protrusions against the rotation of the one having the higher rigidity becomes relatively small. Hence, even if the shaft portion becomes eccentric, the shaft portion can be smoothly rotated with little obstruction to the rotation of the shaft portion.

Moreover, since the inner peripheral portion of the bearing portion has a larger inner diameter than the outer peripheral portion of the shaft portion, there is a gap between the inner peripheral portion of the bearing portion and the outer peripheral portion of the shaft portion, on the sides of the protrusions along the rotational direction of the shaft portion. As described above, if the shaft portion is rotated in the eccentric state, the protrusions are plastically deformed. However, the plastically deformed portion of the protrusion is dragged toward the rotational direction due to the relative rotation of the one having the higher rigidity with respect to the one having the lower rigidity, and is settled in the above-mentioned gap. Therefore, the plastically deformed portions of the protrusions do not become an obstruction to the rotation of the shaft portion. In this sense, the shaft portion can be smoothly rotated, enabling the gas pressure supplied from the gas generator to be set to a small value. Thereby, the gas generator, the cylinder, the piston and the like can be made small, which contributes to the reduction in the size of the webbing retractor.

With the present invention, if the portion of the protrusions contacting the one having the higher rigidity is relatively extremely small compared to the area of the portion of the one having the higher rigidity facing the other having the lower rigidity, basically the above-described function is performed. Therefore, the contact state of the protrusion with respect to one having the higher rigidity maybe any of face contact, linear contact and point contact, but from the viewpoint that the smaller the contact portion, the better, linear contact is better than face contact.

According to the webbing retractor of the second aspect, by molding the cover with a synthetic resin material, the cover is made lightweight compared to the case where the cover is molded with a metal material, which contributes to making the webbing retractor lightweight. Of the cover, however, the peripheral portion of the bearing hole for pivotally supporting the pinion, the stopper of a portion facing the rack bar along the moving direction of the piston pushed out from the cylinder, and the restricting portion at the opposite side of the pinion with respect to the rack bar are formed with a metal. Hence, these portions have higher strength than the other portions. Therefore, sufficient strength against friction, impact and pressing force can be secured, when the pinion rotates, when the piston is pushed out from the cylinder to bring the rack bar into contact with the stopper, and when the rack bar is displaced toward the opposite side of the pinion and brought into contact with the restricting portion by means of the reaction force from the pinion when the rack bar meshes with the pinion.

According to the webbing retractor of the third aspect, the number of the protrusions formed in the vicinity of the portion facing the shaft portion along the pressing direction of the rack bar against the pinion is greater than the number of the protrusions formed in the another portion.

The rack bar is to rotate the pinion by pressing the pinion teeth by means of the teeth of the rack bar. By means of the pressing force at this time, the pinion becomes eccentric along the pressing direction. Here, with the webbing retractor of the present invention, by forming protrusions as described above, the number of the protrusions formed is greater in the eccentric direction of the pinion. Therefore, when the pinion becomes eccentric, the outer peripheral portion thereof disposed on the inside of the bearing means presses the protrusions to plastically deform them.

According to the webbing retractor of the fourth aspect, since the protrusion is brought into linear contact with the side where the protrusion is not formed, the pressing force concentrates more effectively on the protrusion. Hence, the protrusion is plastically deformed more easily.

According to the webbing retractor of the fifth aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the sixth aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the seventh aspect, the protrusions are formed in the opposite side of the rack bar with respect to the pinion, and on the inner peripheral portion of the bearing portion facing the outer peripheral portion of the shaft portion along the direction of the meshing face of the rack bar and the pinion.

The rack bar is to rotate the pinion by pressing the pinion teeth by means of the teeth of the rack bar, and the pressing force at this time operates in the direction of the meshing face between the rack bar and the pinion. Therefore, by forming the protrusions as described above, the number of the protrusions formed is greater in the eccentric direction of the pinion. Therefore, when the pinion becomes eccentric, the outer peripheral portion thereof arranged on the inside of the bearing means presses the protrusions to plastically deform them.

According to the webbing retractor of the eighth aspect, since the protrusion is brought into linear contact with the side where the protrusion is not formed, the pressing force concentrates more effectively on the protrusion. Hence, the protrusion is plastically deformed more easily.

According to the webbing retractor of the ninth aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the tenth aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the eleventh aspect, the number of the protrusions formed in the vicinity of the portion facing the shaft portion along the pressing direction of the rack bar against the pinion is greater than the number of the protrusions formed in the another portion.

The rack bar is to rotate the pinion by pressing the pinion teeth by means of the teeth of the rack bar. By means of the pressing force at this time, the pinion becomes eccentric along the pressing direction. Here, with the webbing retractor of the present invention, by forming protrusions as described above, the number of the protrusions formed is greater in the eccentric direction of the pinion. Therefore, when the pinion becomes eccentric, the outer peripheral portion thereof disposed on the inside of the bearing means presses the protrusions to plastically deform them.

According to the webbing retractor of the twelfth aspect, since the protrusion is brought into linear contact with the side where the protrusion is not formed, the pressing force concentrates more effectively on the protrusion, hence the protrusion is plastically deformed more easily.

According to the webbing retractor of the thirteenth aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the fourteenth aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the fifteenth aspect, the protrusions are formed in the opposite side of the rack bar with respect to the pinion, and on the inner peripheral portion of the bearing portion facing the outer peripheral portion of the shaft portion along the direction of the meshing face of the rack bar and the pinion.

The rack bar is to rotate the pinion by pressing the pinion teeth by means of the teeth of the rack bar, and the pressing force at this time operates in the direction of the meshing face between the rack bar and the pinion. Therefore, by forming the protrusions as described above, the number of the protrusions formed is greater in the eccentric direction of the pinion. Therefore, when the pinion becomes eccentric, the outer peripheral portion thereof arranged on the inside of the bearing means presses the protrusions to plastically deform them.

According to the webbing retractor of the sixteenth aspect, since the protrusion is brought into linear contact with the side where the protrusion is not formed, the pressing force concentrates more effectively on the protrusion. Hence, the protrusion is plastically deformed more easily.

According to the webbing retractor of the seventeenth aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the eighteenth aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the nineteenth aspect, since the protrusion is brought into linear contact with the side where the protrusion is not formed, the pressing force concentrates more effectively on the protrusion. Hence, the protrusion is plastically deformed more easily.

According to the webbing retractor of the twentieth aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the twenty-first aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the twenty-second aspect, when the inertial mass body moves due to change in the acceleration in the abrupt deceleration state of the vehicle, the restriction member is displaced according to the movement of the inertial mass body to thereby restrict rotation of the V gear. If the lock base rotates in the state that the rotation of the V gear is restricted, relative rotation is caused between the V gear and the lock base, and the V gear displaces the lock plate due to the relative rotation, to thereby mesh the external teeth of the lock plate with the internal ratchet teeth. Thereby, the rotation of the lock base in the pulling-out direction is resisted. At this time, the webbing tensile force operates on the torsion shaft as a rotation force in the pulling-out direction via the take-up shaft. Thereby, the torsion shaft is distorted, and the take-up shaft is rotated in the direction for pulling out the webbing with respect to the lock base to thereby pull out the webbing. Hence, the energy is absorbed.

According to the webbing retractor of the twenty-third aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pulling-out direction, the spiral coil spring is provided with increased number of winding, to thereby increase the restoring force. This restoring force becomes the urging force for urging the take-up shaft in the take-up direction.

According to the webbing retractor of the twenty-fourth aspect, the urging means is the spiral coil spring. The one end of the spiral coil spring is engaged directly or indirectly with the take-up shaft, and the other end is directly or indirectly engaged with the other leg plate of the frame. When the take-up shaft is rotated in the pullindg-out direction, the spiral coil spring is provided with increased number of winding, to thereby increase the restoring force. This restoring force becomes the urging force for urging the take-up shaft in the take-up direction.

BRIEF DESCRIPTION OF THE DRAWINGS

FIG. 12 is a back view showing structure of a recess in a clutch portion.

FIG. 13A is a side view showing structure of a roller in the clutch portion, and FIG. 13B is a front view showing the structure of the roller in the clutch portion.

FIG. 29 is a sectional view along the line 29—29 in FIG. 25, showing a state at the time of positioning the compression coil spring.

DESCRIPTION OF THE PREFERRED EMBODIMENTS

Figure 1:
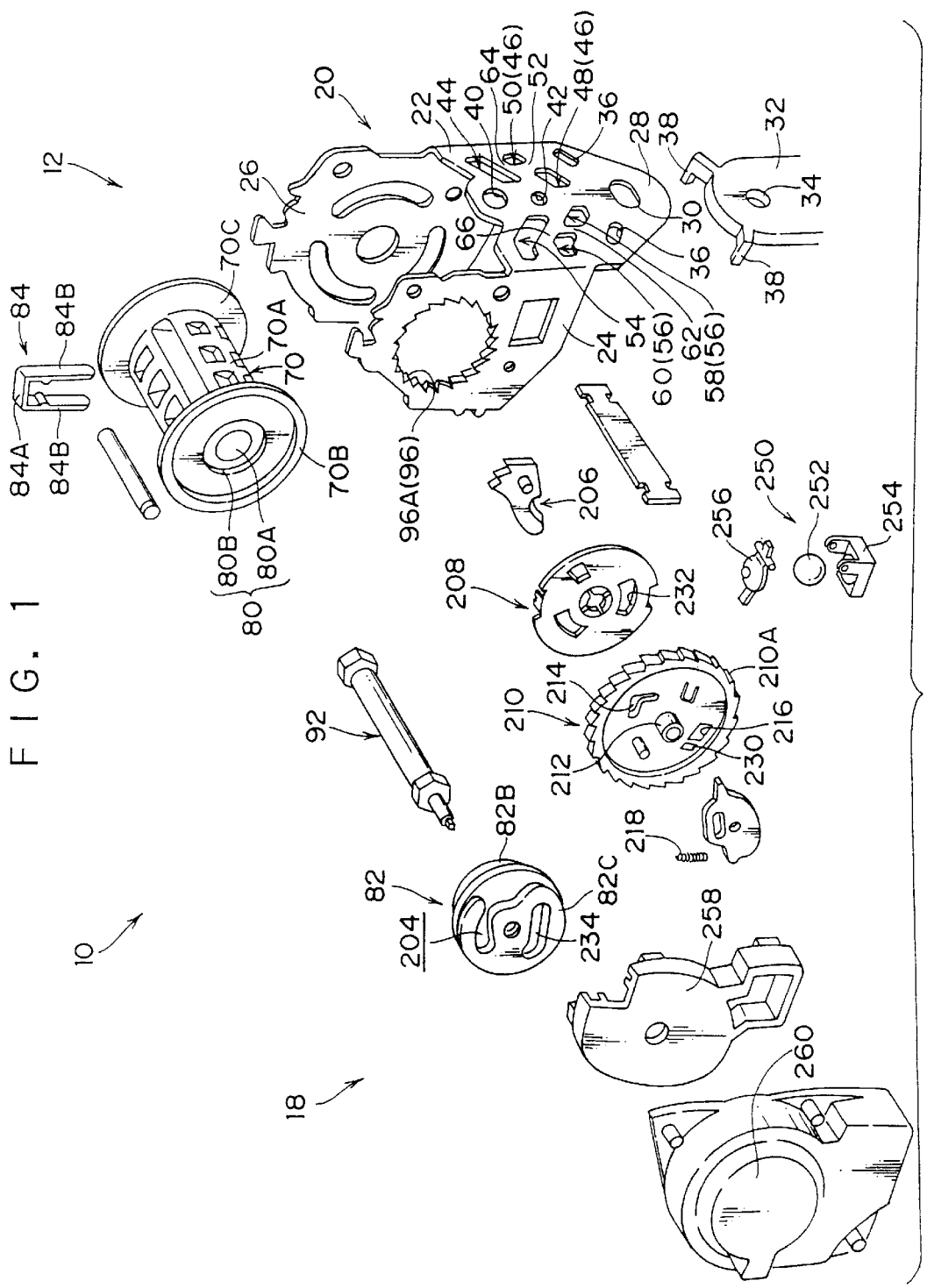
FIG. 1 is an exploded perspective view showing structure of one leg plate side of a frame, of structure of a webbing retractor according to an embodiment of the present invention.
Figure 2:
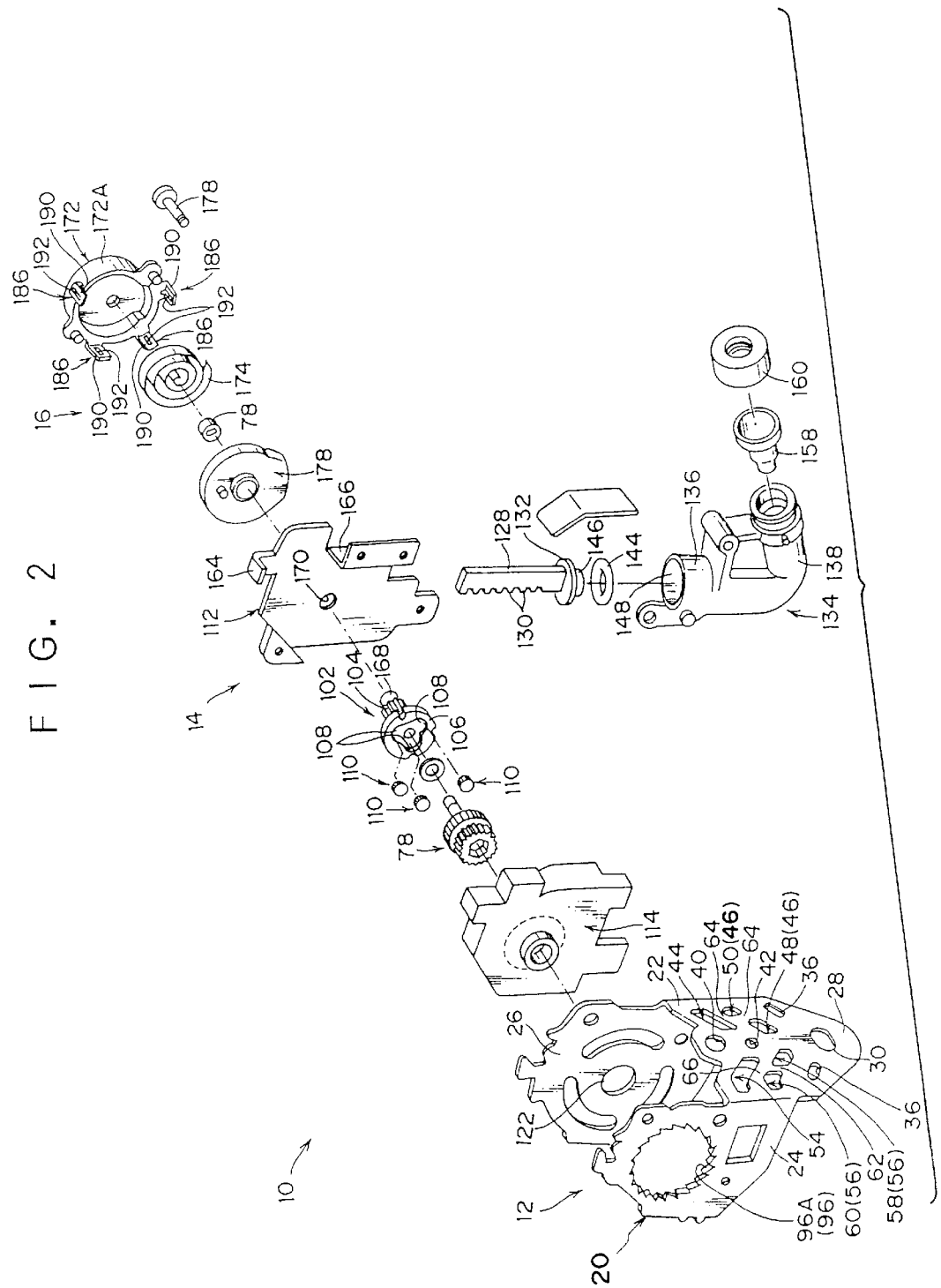
FIG. 2 is an exploded perspective view showing structure of the other leg plate side of a frame, of the structure of the webbing retractor according to the embodiment of the present invention.

FIG. 1 and FIG. 2 show exploded perspective views of a webbing retractor 10 according to an embodiment of the present invention. As shown in these figures, the webbing retractor 10 comprises an apparatus body 12, a pretensioner 14, an urging section 16 and a lock device 18.

Figure 3:
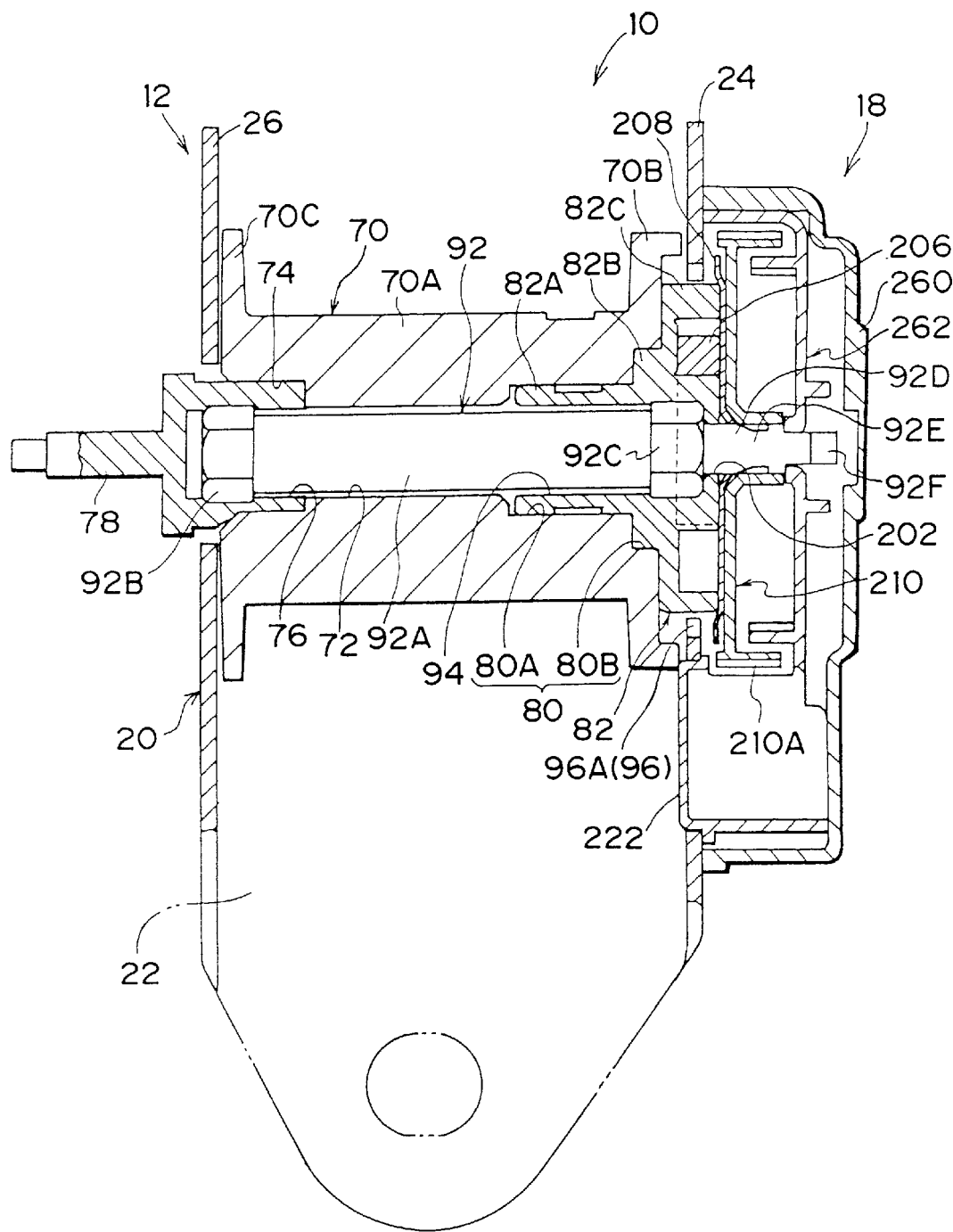
FIG. 3 is a sectional front view showing structure of an apparatus body and a lock device, of the structure of the webbing retractor according to the embodiment of the present invention.

As shown in FIGS. 1, 2 and 3, the apparatus body 12 comprises a frame 20. The frame 20 comprises a base portion 22 in a plane-table form, and a pair of leg plates 24 and 26 extended in parallel from both end portions in the width direction of the base portion 22, and is U-shaped as a whole, so as to be open at one side in the thickness direction of the base portion 22, as seen in a plan view.

[Detailed Description of the Frame 20]

Figure 4:
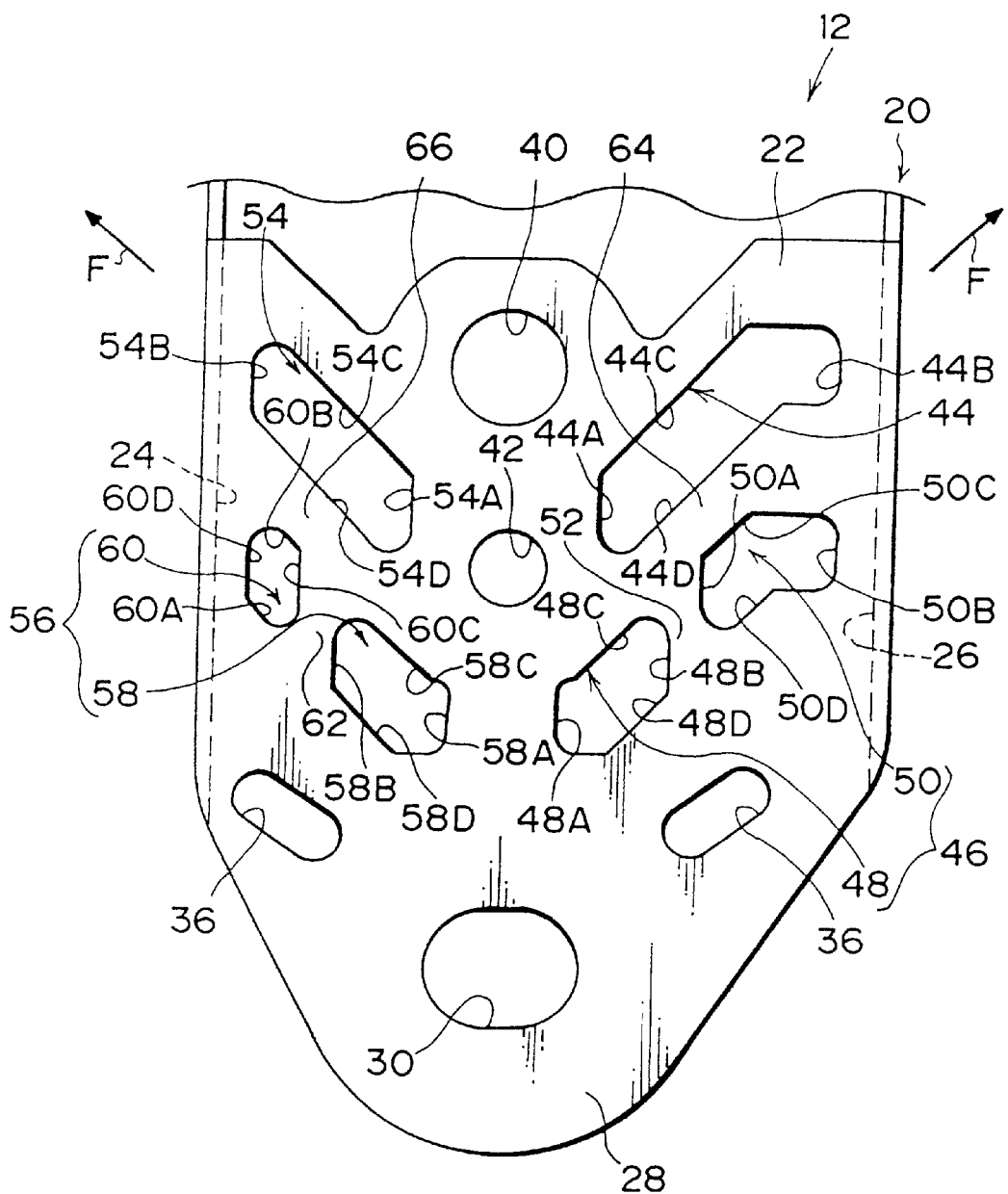
FIG. 4 is a front view of the frame.

FIG. 4 is a front view of the frame 20. As shown in this figure, a side of the base portion 22 of the frame 20, which side being lower than a portion connecting the leg plates 24 and 26 is a fixing portion 28, the fixing portion 28 is in a substantially triangular shape, having a width that gradually decreases in the downward direction. In the vicinity of a peak portion thereof (the lower end portion), there is formed a bolt insertion hole 30 penetrating through in the thickness direction of the base portion 22. The bolt insertion hole 30 is an elongated hole whose longer side is along the width direction of the base portion 22. A bolt penetrates through the bolt insertion hole 30, and is fastened by a nut or the like in the state of penetrating through a penetration hole 34 of a supporting portion 32 provided in a vehicle body. Thereby, the base portion 22 is fixed to the supporting portion 32, and the webbing retractor 10 is supported by the vehicle body.

Above the bolt insertion hole 30, a pair of positioning holes 36 are formed. Each of the positioning holes 36 is an elongated hole whose longitudinal direction slants toward the width direction of the base portion 22 with respect to the longitudinal direction (vertical direction) of the base portion 22, and is formed generally along both ends in the width direction of the fixing portion 28, in such a shape that the gap between them gradually narrows toward the peak portion (the lower end portion) of the fixing portion 28 in a tapered manner. In the above-described supporting portion 32, a pair of pawls 38 are formed corresponding to these positioning holes 36. By fitting these pawls 38 to the positioning holes 36 by insertion, the base portion 22 is provisionally supported by the supporting portion 32, so that the base portion 22 can be positioned with respect to the supporting portion 32.

These positioning holes 36 can prevent erroneous assembly of the webbing retractor 10 on a driver seat side and the webbing retractor 10 on a front passenger seat side, for example, by changing the angle between positioning holes 36 for the webbing retractor 10 on the driver seat side from the angle between positioning holes 36 for the webbing retractor 10 on the front passenger seat side, and by adjusting the angle between a pair of the pawls 38 of the supporting portion 32 on the driver seat side and the angle between a pair of the pawls 38 of the supporting portion 32 on the front passenger seat side to the angle of the corresponding positioning holes 36.

On the other hand, a pilot hole 40 for guiding during press molding for molding the frame 20 is formed in an intermediate portion of the base portion 22 in the width direction in the vicinity of an upper end portion thereof. Beneath the pilot hole 40, a connector attachment hole 42 is formed. To the connector attachment hole 42 is fitted a connector attached to a wire harness extending in the vicinity of the webbing retractor 10.

In the leg plate 24 side of the connector attachment hole 42, a plurality of hole portions 54 and 56 are formed. As shown in FIG. 4, the hole portion 54 is an elongated hole whose longitudinal direction is from an end portion 54A to an end portion 54B or in the opposite direction thereof, such that the end portion 54A on the side towards the center in the width direction of the base portion 22 is located lower than the end portion 54B on the side towards the exterior in the width direction of the base portion 22 (that is, towards the leg plate 24). The direction from the end portion 54A to the end portion 54B is parallel to the direction from the center of the bolt insertion hole 30 to the center of a ratchet hole 96 formed in the leg plate 24.

Moreover, the hole portion 54 has roughly the same width along the longitudinal direction of the hole portion 54, and one end portion 54C and the other end portion 54D in the width direction of the hole portion 54 are parallel to each other. However, the end portions 54A and 54B are generally linear along the vertical direction of the base portion 22, and are not at right angles to the longitudinal direction of the hole 54. Therefore, as a whole the hole portion 54 is substantially in a shape of a parallelogram.

On the other hand, the hole portion 56 is formed below the hole portion 54. The hole portion 56 is formed by two through holes, a rectangular hole 58 and a rectangular hole 60. The rectangular hole 58 is an elongated hole whose longitudinal direction is from an end portion 58A to an end portion 58B or in the opposite direction thereof, such that the end portion 58A on the side towards the center in the width direction of the base portion 22 is located lower than the end portion 58B on the side towards the exterior in the width direction of the base portion 22 (that is, towards the leg plate 24). Moreover, the rectangular hole 58 has generally the same width along the longitudinal direction of the hole 58, and both end portions 58C and 58D in the width direction of the hole 58 are parallel to each other. However, the end portions 58A and 58B are generally linear along the vertical direction of the base portion 22, and are not at right angles to the longitudinal direction of the hole 58. Therefore, as a whole the rectangular hole 58 is substantially in a shape of a parallelogram.

The rectangular hole 60 is formed at a position that is towards the upper side and the leg plate 24, with respect to the rectangular hole 58. The rectangular hole 60 is an elongated hole whose longitudinal direction is from an end portion 60A to an end portion 60B or in the opposite direction thereof, such that one of the end portions in the longitudinal direction of the base portion 22, i.e., the end portion 60B, is located more towards the exterior in the width direction of the base portion 22 and the upper side, than the other end portion, i.e., the end portion 60A.

Further, the end portion 60A is located on a line extending from the end portion 58C of the above-described rectangular hole 58, and the end portion 60B is located on a line extending from the end portion 58D of the above-described rectangular hole 58. Both end portions 60C and 60D in the width direction of the hole 60 are parallel to each other.

A portion between the end portion 60C of the rectangular hole 60, which is located towards the center in the width direction of the base portion 22, and the end portion 58B of the rectangular hole 58, which is located towards the exterior in the width direction (that is, towards the leg plate 24) of the base portion 22 is a bridge portion 62. The bridge portion 62 corresponds to the positioning hole 36 located towards the leg plate 24, of the pair of the positioning holes 36 described above. The bridge portion 62 is located above the end portion located towards the exterior in the width direction of the base portion 22, of the two end portions in the longitudinal direction of this positioning hole 36. Since the bridge portion 62 is located above the end portion of the positioning hole 36 located towards the exterior in the width direction of the base portion 22, a positioning protrusion of the frame 20 formed on the supporting portion 32 which enters the positioning hole 36 is prevented from erroneously entering the rectangular hole 58 or the rectangular hole 60.

In addition, the hole portion 56 formed by the rectangular hole 58 and the rectangular hole 60 can be considered as being divided into the rectangular hole 58 and the rectangular hole 60 by the bridge portion 62. When the hole portion 56 is considered in terms of a functional aspect, it is proper to consider the hole portion. 56 to be divided by the bridge portion 62. That is, if a structure in which the bridge portion 62 from the hole portion 56 shown in FIG. 4 is not formed were to be postulated, the hole portion 56 would be an elongated hole parallel to the hole portion 54 from the end portion 58A to the end portion 60B or in the opposite direction, and the longitudinal direction thereof would be parallel to the direction from the center of the bolt insertion hole 30 to the center of the ratchet hole 96 formed in the leg plate 24.

In contrast to the above, a plurality of hole portions 44 and 46 are formed in the leg plate 26 side of the pilot hole 40. The hole portion 44 is an elongated hole whose longitudinal direction is from an end portion 44A to an end portion 44B or in the opposite direction thereof, such that the end portion 44A, which is towards the center in the width direction of the base portion 22 is located lower than the end portion 44B, which is towards the exterior in the width direction of the base portion 22 (that is, towards the leg plate 26). The direction from the end portion 44A to the end portion 44B is parallel to the direction from the center of the bolt insertion hole 30 to the center of the leg plate 26. Moreover, the hole portion 44 has roughly the same width along the longitudinal direction of the hole portion 44, and both end portions 44C and 44D in the width direction of the hole portion 44 are parallel to each other. However, the end portions 44A and 44B are generally linear along the vertical direction of the base portion 22, and are not at right angles to the longitudinal direction of the hole 44. Therefore, as a whole the hole portion 44 is substantially in a shape of a parallelogram.

On the other hand, the hole portion 46 is formed below the hole portion 44. The hole portion 46 is formed by two through holes, a rectangular hole 48 and a rectangular hole 50. The rectangular hole 48 is an elongated hole whose longitudinal direction is from an end portion 48A to an end portion 48B or in the opposite direction thereof, such that the end portion 48A, which is towards the center in the width direction of the base portion 22, is located lower than the end portion 48B, which is towards the exterior in the width direction of the base portion 22 (that is, towards the leg plate 26). Moreover, the rectangular hole 48 has generally the same width along the longitudinal direction of the hole 48, and both end portions 48C and 48D in the width direction of the hole 48 are parallel to each other. However, the end portions 48A and 48B are generally linear along the vertical direction of the base portion 22, and are not at right angles to the longitudinal direction of the hole 48.

The rectangular hole 50 is formed at a position that is on the upper side and towards the leg plate 26 side, with respect to the rectangular hole 48. The rectangular hole 50 is an elongated hole whose longitudinal direction is along the vertical direction of the base portion 22, and an upper end 50C and a lower end 50D thereof are on a line extending from the end portion 48C and 48D, respectively, of the above-described rectangular hole 48. In contrast, the both end portions 50A and 50B of the rectangular hole 50 are along the vertical direction of the base portion 22, and parallel to each other. That is, as a whole the rectangular hole 50 is substantially in a shape of a parallelogram.

A portion between the end portion 50A of the rectangular hole 50, which is located towards the center in the width direction of the base portion 22, and the end portion 48B of the rectangular hole 48, which is located towards the exterior in the width direction (that is, towards the leg plate 26) of the base portion 22 is a bridge portion 52. The bridge portion 52 corresponds to the positioning hole 36 located on the leg plate 26 side of the base portion 22, of the pair of the positioning holes 36 described above. The bridge portion 52 is located above the end portion located towards the exterior in the width direction of the base portion 22, of the two end portions in the longitudinal direction of this positioning hole 36. Since the bridge portion 52 is located above the end portion of the positioning hole 36 located towards the exterior in the width direction of the base portion 22, the pawl portion 38 of the supporting portion 32 is prevented from erroneously entering the rectangular hole 48 or the rectangular hole 50.

In addition, the hole portion 46 formed by the rectangular hole 48 and the rectangular hole 50 can be considered as being divided into the rectangular hole 48 and the rectangular hole 50 by the bridge portion 52. When the hole portion 46 is considered in terms of a functional aspect, it is proper to consider that the hole portion 46 to be divided by the bridge portion 52.

That is, if a structure in which the bridge portion 52 from the hole portion 46 shown in FIG. 4 is not formed were to be postulated, the hole portion 46 would be an elongated hole substantially in a shape of a parallelogram, parallel to the hole portion 44 from the end portion 48A to the end portion 50D or in the opposite direction, and the longitudinal direction thereof would be parallel to the direction from the center of the bolt insertion hole 30 to the center of the ratchet hole 96 formed in the leg plate 24.

If hole portions 54, 56, 44 and 46 as described above are formed, the weight of the base portion will become lighter than the case where such hole portions 54, 56, 44 and 46 are not formed, but the rigidity of the base portion will decrease.

However, the longitudinal directions of the hole portions 54, 56, 44 and 46 are parallel to the working direction of the tensile force F operating on the base portion 22 via the leg plates 24 and 26, when the webbing belt 68 (see FIG. 5) for restraining an occupant is pulled out in a state in which the rotation of the spool 70 as the take-up shaft, which will be described later, is restricted. Therefore, a bone portion 64 formed between the hole portion 54 and the hole portion 56 is longitudinal along the working direction of the tensile force F and has generally the same width. A bone portion 66 formed between the hole portion 44 and the hole portion 46 is longitudinal along the working direction of the tensile force F and has generally the same width. By forming such bone portions 64 and 66, the overall rigidity of the base portion 22 decreases, but the strength (rigidity) against the tensile force F can be secured, and the rigidity of the base portion 22 against the tensile force F (in other word, elasticity) becomes uniform.

Figure 5:
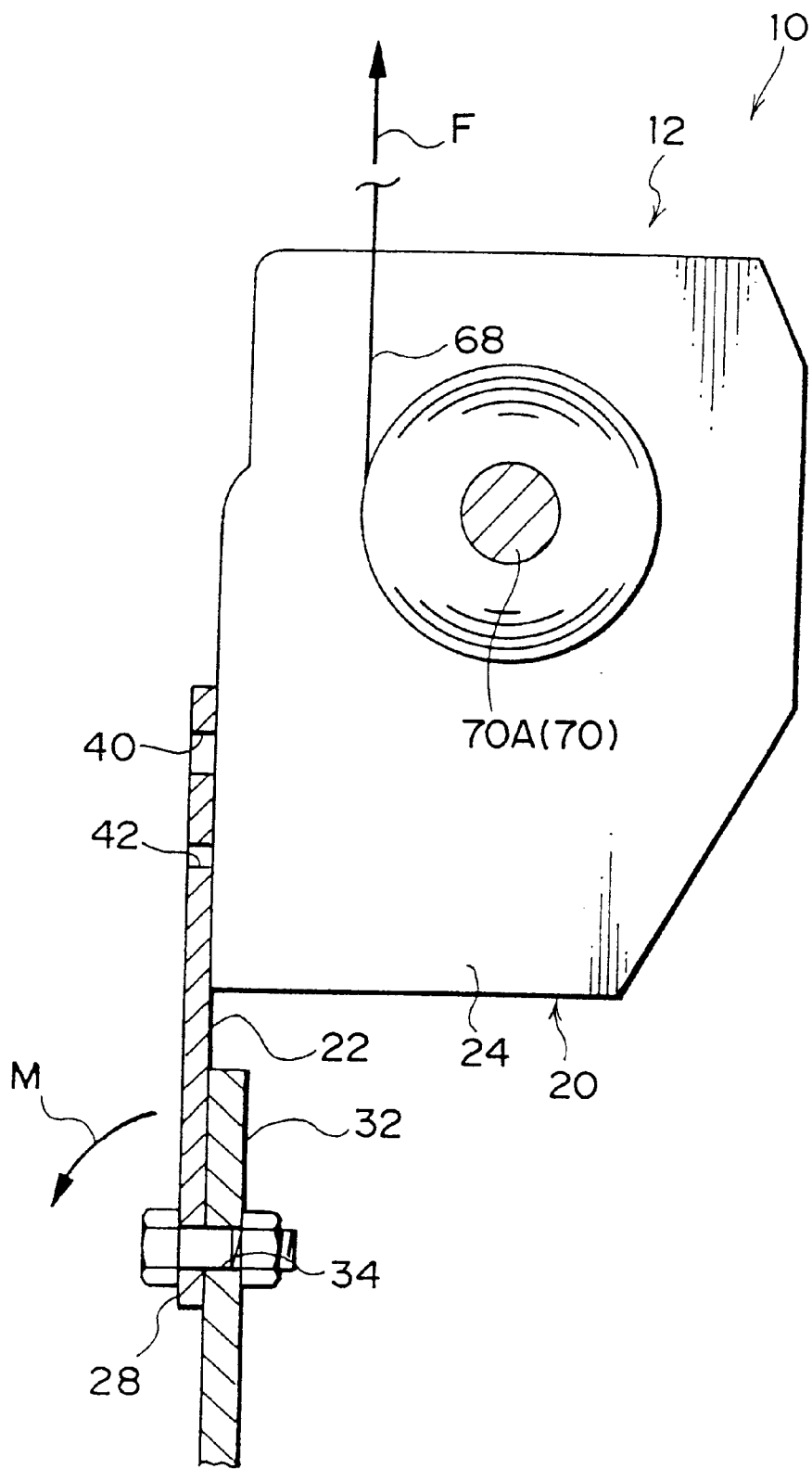
FIG. 5 is a longitudinal sectional view showing an outline of the structure of the webbing retractor according to the embodiment of the present invention and is a diagram showing the direction of rotational moment caused at the time when the tensile force operates.

Therefore, with this webbing retractor 10, the tensile force F shown in FIG. 5 and deformation of the base portion 22 due to the rotational moment M caused by the tensile force F can be suppressed or prevented. Hence, decrease in the restraining force of the webbing belt 68 resulting from the deformation of the base portion 22 can be suppressed or prevented.

[Construction of the Spool 70]

As shown in FIG. 1 and FIG. 3, the spool 70 as a take-up shaft is arranged between the leg plate 24 and the leg plate 26 of the above-described frame 20. The spool 70 is formed by a spool shaft 70A in a cylindrical form forming a shaft core portion, and a pair of flange portions (hereinafter a flange portion disposed on the leg plate 24 side is referred to as a "flange 70B", and a flange portion disposed on the leg plate 26 side is referred to as a "flange 70C") each formed in a substantially disk-like form on both end portions of the spool shaft 70A. The spool 70 is in a hand drum-like form as a whole.

As shown in FIG. 3, a shaft insertion hole 72 is formed in the shaft core portion of the spool shaft 70A, and a torsion shaft 92 is inserted therein. Moreover, on the flange 70C side of the shaft insertion hole 72, there is formed a sleeve receiving portion 74 in a recessed form having a larger diameter than that of the shaft insertion hole 72. A female spline is formed on the inner peripheral portion of the sleeve receiving portion 74, and a male spline is formed on the outer peripheral portion of a sleeve 78. The sleeve 78 having a fitting hole 76 in a hexagonal form formed therein is fitted in the sleeve receiving portion 74.

On the other hand, on the flange portion 70B side in the shaft insertion hole 72, there is formed a lock base receiving portion 80 in a recessed form having a larger diameter than that of the shaft insertion hole 72. The lock base receiving portion 80 is structured by a recess body 80A forming most of the lock base receiving portion, and a recess end portion 80B having a larger diameter than that of the recess body 80A. To this lock base receiving portion 80 is attached a lock base 82 produced by die-casting.

Figure 7:
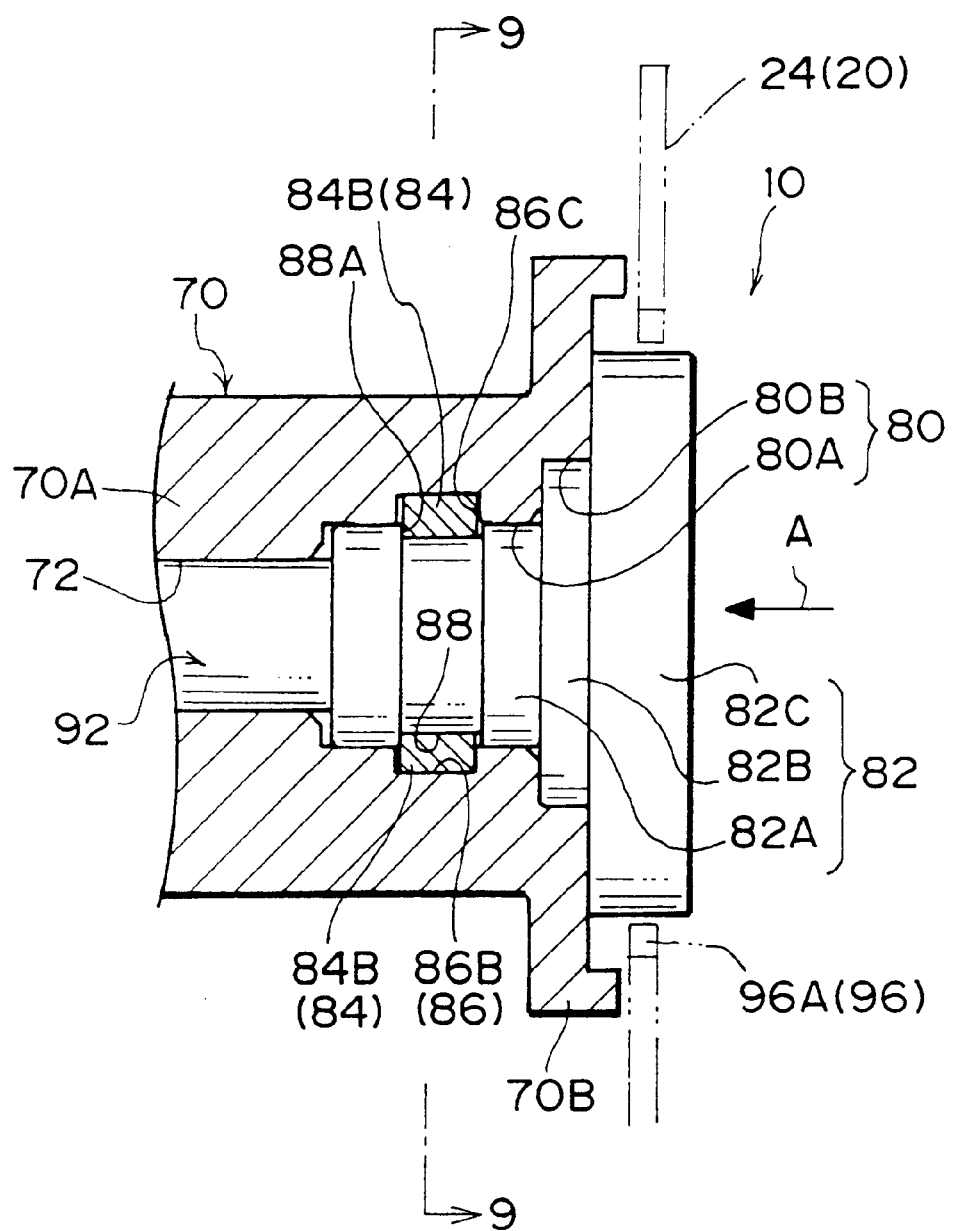
FIG. 7 is a sectional plan view along the line 7—7 in FIG. 9 showing structure of assembly of a spool and a lock base.
Figure 8:
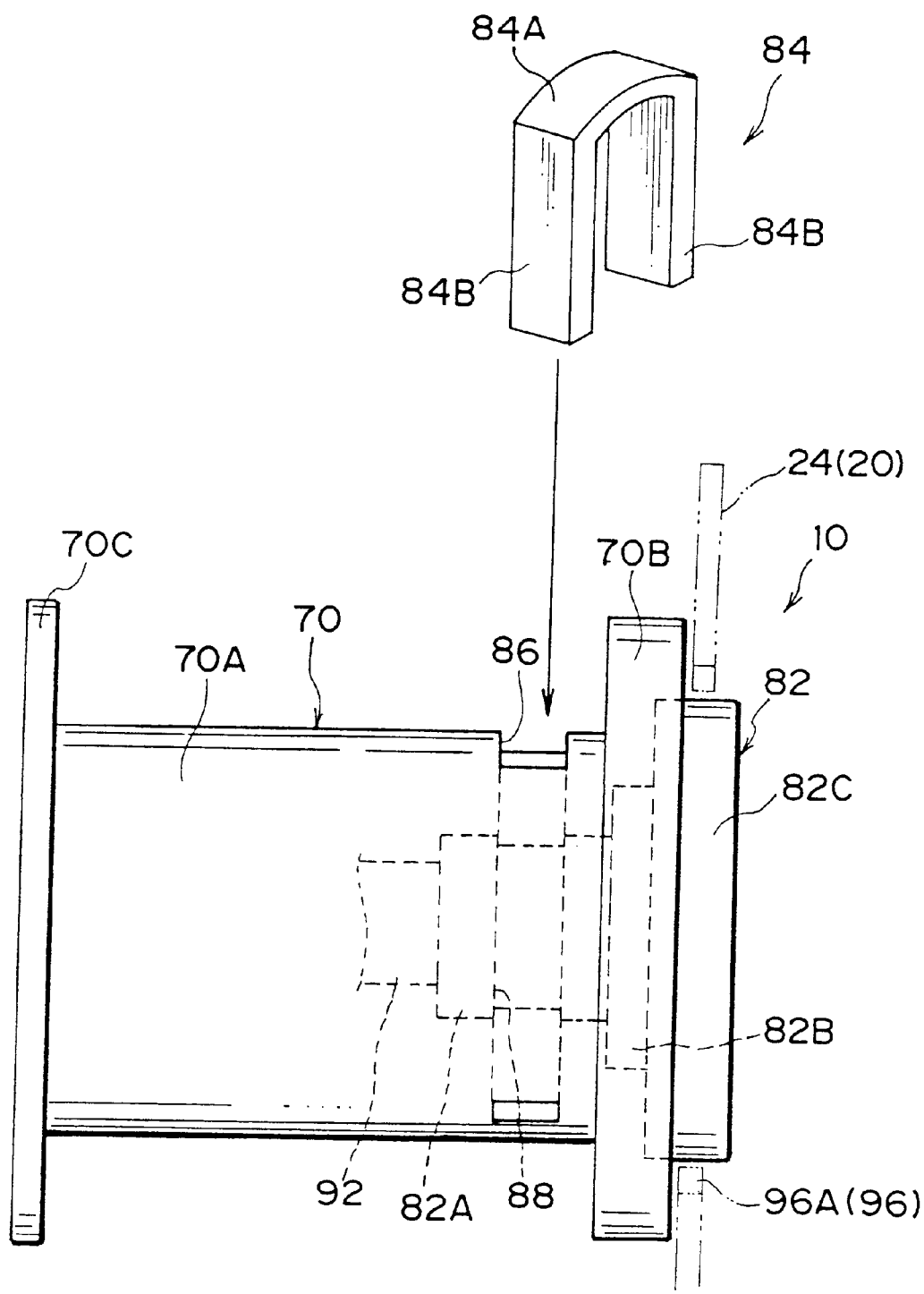
FIG. 8 is a front view showing structure of assembly of the spool and the lock base.
Figure 9:
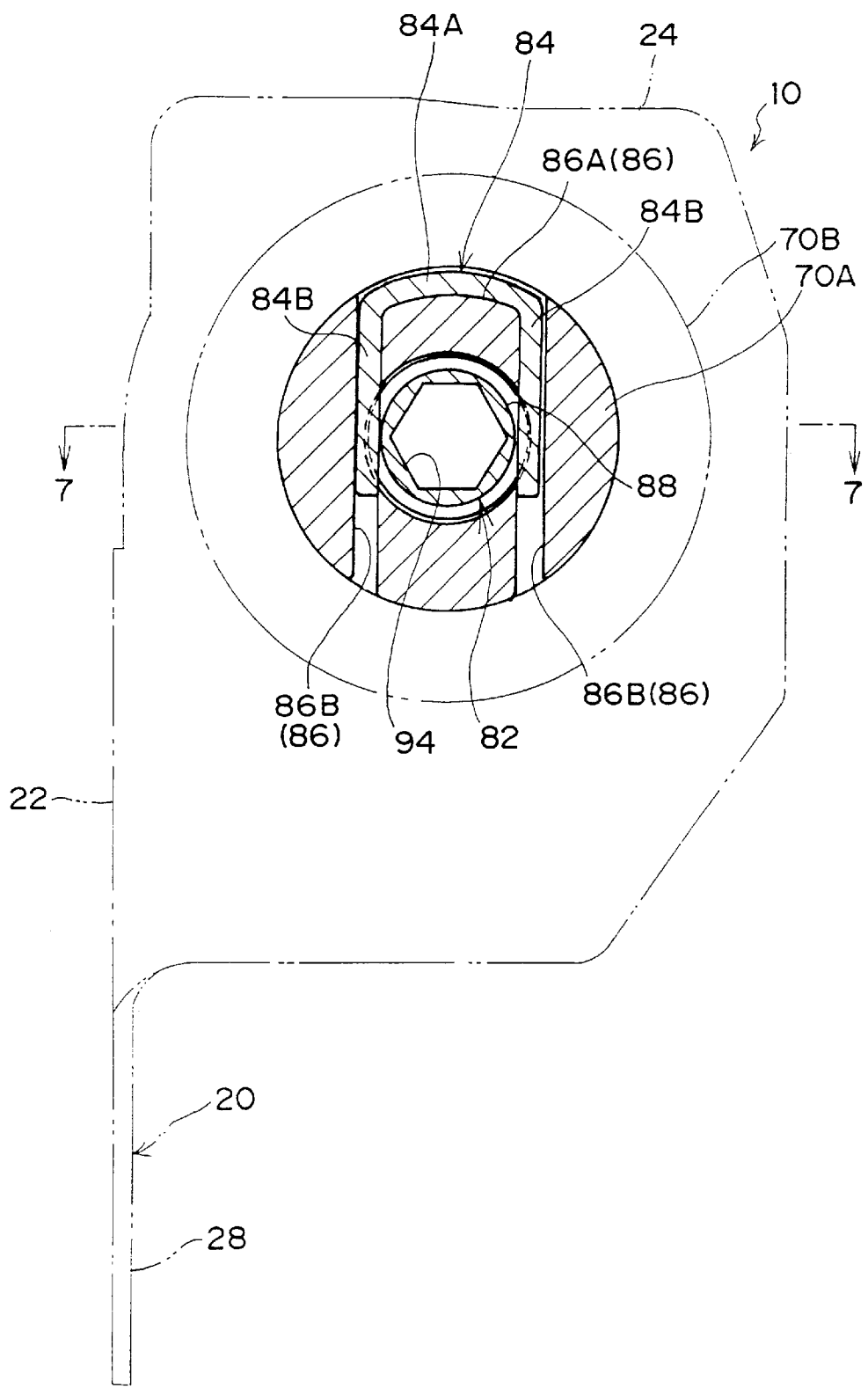
FIG. 9 is a longitudinal sectional view along the line 9—9 in FIG. 7 showing the structure of assembly of the spool and the lock base.

Moreover, as shown in FIGS. 7 to 9, in an intermediate portion in the axial direction of the recess body 80A in the spool shaft 70A, there is formed a stopper insertion groove 86, into which a stopper 84, which will be described later, can be inserted. The stopper insertion groove 86 comprises a top mounting groove 86A formed in a form of an arc plane along the outer peripheral portion of the spool shaft 70A and having a cross-section in a reversed convex shape, and a pair of leg insertion grooves 86B formed orthogonal to the top mounting groove 86A and parallel to each other. Correspondingly thereto, an annular groove 88 is formed at a position facing the pair of leg insertion grooves 86B, in an intermediate portion in the axial direction of the base portion 82A in the lock base 82.

Into the stopper insertion groove 86 and the annular groove 88, a stopper 84 formed substantially in a U-shaped form, as seen from the front, is inserted. Thereby, the lock base 82 is fixed to the lock base receiving portion 80 of the spool shaft 70A, in a state in which the lock base 82 is prevented from coming off.

Figure 10:
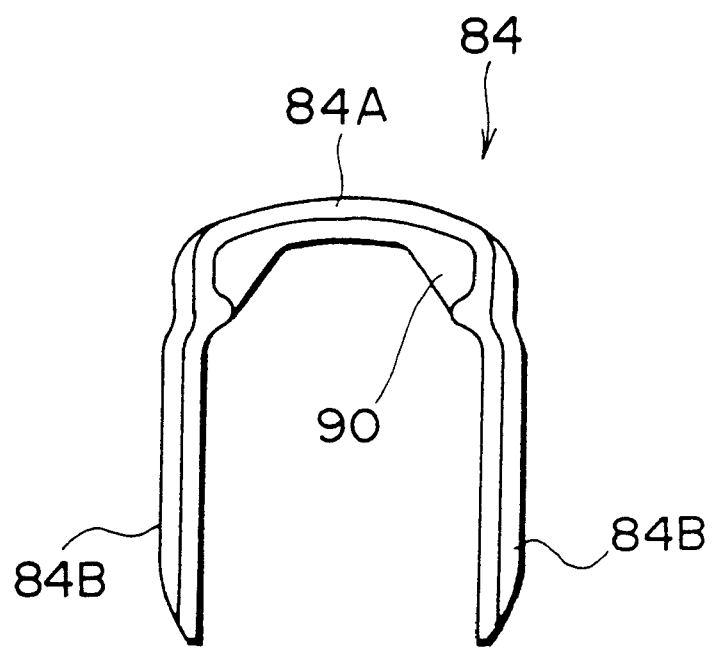
FIG. 10 is a front view of a stopper.

As shown in FIG. 10, the stopper 84 comprises a top portion 84A, and a pair of leg portions 84B hanging in parallel from both sides of the top portion 84A. On an inner peripheral portion of a portion spanning the top portion 84A and the leg portion 84B, a rib 90 having a predetermined width is formed integrally. Thereby, a sectional shape of the top portion 84A of the stopper 84 is in a reversed convex shape that is the same as that of the top mounting groove 86A formed in the spool shaft 70A. Moreover, the dimension of the leg portion 84B of the stopper 84 in the width direction is set to be substantially the same dimension as the groove width of the leg insertion groove 86B and the annular groove 88. Furthermore, the stopper 84 is formed with a resin material or a spring material, so that the pair of the leg portions 84B can be elastically deformed in the directions of approaching each other and becoming more distant from each other.

The stopper 84 is pressed in between one side of the leg insertion groove 86B of the spool shaft 70A, i.e., side 86C and one side of the annular groove 88 of the lock base 82, i.e., side 88A, in a form in which the leg portions 84B are pushed therein. Thereby, the lock base 82 is pressed toward the center of the spool shaft 70A in the axial direction (toward the direction of an arrow A in FIG. 7). Hence, looseness in the axial direction between the lock base 82 and the spool shaft 70A is eliminated. Moreover, since the pair of the leg portions 84B of the stopper 84 are pressed in between the leg insertion groove 86B of the spool shaft 70A and the annular groove 88 of the lock base 82, that is, at both sides in the radial direction of the base portion 82A of the lock base 82, looseness in the radial direction between the outer peripheral portion of the base portion 82A of the lock base 82 and the inner peripheral portion of the recess body 80A of the spool shaft 70A is also eliminated. As a result, in a state in which looseness in both directions of the axial direction and the radial direction is eliminated, the lock base 82 and the spool shaft 70A are interconnected, and the lock base 82 is prevented from coming off from the spool shaft 70A. Thereby, according to this embodiment, generation of abnormal sound between the lock base 82 and the spool shaft 70A is prevented. In addition to this effect, since the stopper 84 is formed in a substantially U-shaped form as seen from the front, in a state in which the lock base 82 is fixed to the spool shaft 70A by means of the stopper 84, the lock base 82 receives pressing load from the pair of leg portions 84B evenly at two points equidistant from the axis of the spool shaft 70A, and facing each other in the radial direction. Hence, the lock base 82 is prevented from inclining with respect to the axis of the spool shaft 70A. As a result, winding property of the webbing belt 68 (see FIG. 5) can be improved.

Figure 6:
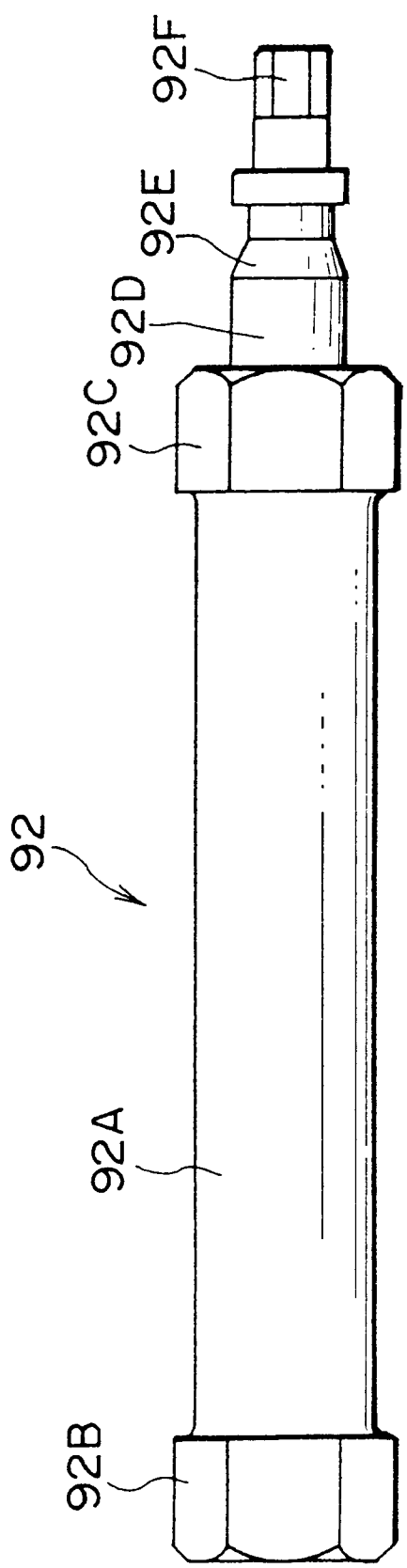
FIG. 6 is a front view showing structure of the torsion shaft.

On the other hand, as shown in FIG. 3, the above-described lock base 82 and the sleeve 78 are interconnected by means of the torsion shaft 92. As shown in FIG. 6, the torsion shaft 92 is structured by a shaft portion 92A forming the main part thereof, a head 92B in a hexagonal shape formed at one end of the shaft portion 92A, a fitting portion 92C in a hexagonal shape formed at the other end of the shaft portion 92A, a small diameter portion 92D extended coaxially with the shaft portion 92A from the shaft core portion of the fitting portion 92C, a gear holding portion 92E formed in such a manner that the diameter thereof becomes smaller from the small diameter portion 92D through a tapered face, and then is enlarged circularly, and a tip portion 92F extended coaxially further from the gear holding portion 92E to form a key. As shown in FIG. 3, the head 92B of the torsion shaft 92 is fitted in the fitting hole 76 having a shape of a hexagonal hole formed in the sleeve 78, and the fitting portion 92C of the torsion shaft 92 is fitted in a fitting hole 94 having a shape of a hexagonal hole formed in the lock base 82. Thereby, the torsion shaft 92 is made integral with the spool shaft 70A via the lock base 82 and the sleeve 78. The torsion shaft 92 having the above-described structure is a main component of a so-called force limiter for absorbing energy by means of the torsion, which is caused by the webbing tension and which is greater than a predetermined value, acting on the spool 70 at the time of abrupt deceleration of the vehicle.

[Construction of the Pretensioner 14]

Figure 11:
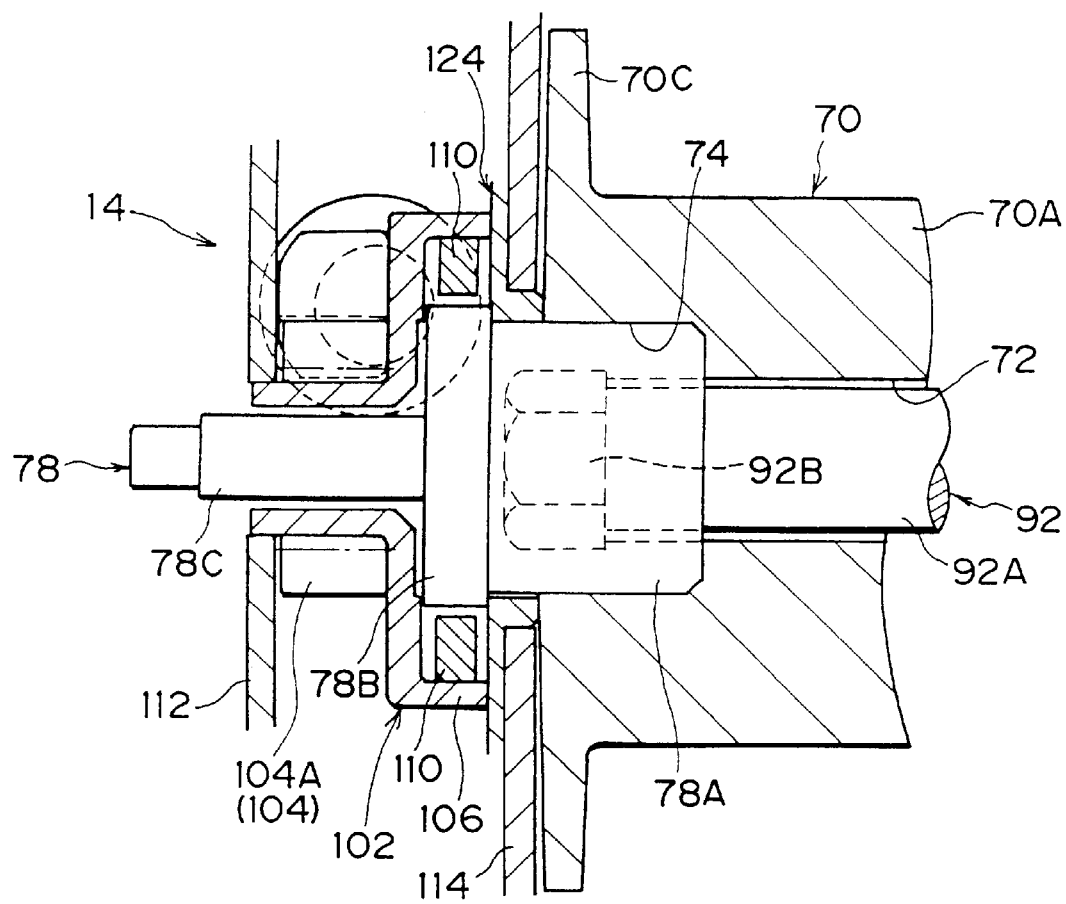
FIG. 11 is a sectional plan view, wherein a main part in the other leg plate is enlarged.

As shown in FIG. 3 and FIG. 11, an intermediate portion 78B and a small diameter portion 78C of the sleeve 78 mounted on the leg plate 26 side of the spool 70 are disposed so as to protrude outside of the leg plate 26. On the outer peripheral portion of the intermidiate portion 78B and the small diameter portion 78C, a pinion 102 forming the pretensioner 14 is fitted. The pinion 102 comprises a teeth portion 104 which covers the small diameter portion 78C of the sleeve 78 and which has pinion teeth 104A formed on the outer peripheral portion thereof, and a clutch portion 106 as a shaft portion, covering the intermediate portion 78B of the sleeve 78 and formed integrally with and adjacent to the teeth portion 104.

As shown in FIG. 12, on the inner peripheral portion of the clutch portion 106, three recesses 108 are formed at intervals of 120 degrees. The recesses 108 communicate with each other in the peripheral direction, and a roller 110 shown in FIG. 13A and FIG. 13B is respectively received at a wide width portion of each recess 108. An outer peripheral portion of each of the rollers 110 is subjected to flat texture knurling of the same structure as that of the intermediate portion 78B of the sleeve 78.

Figure 14:
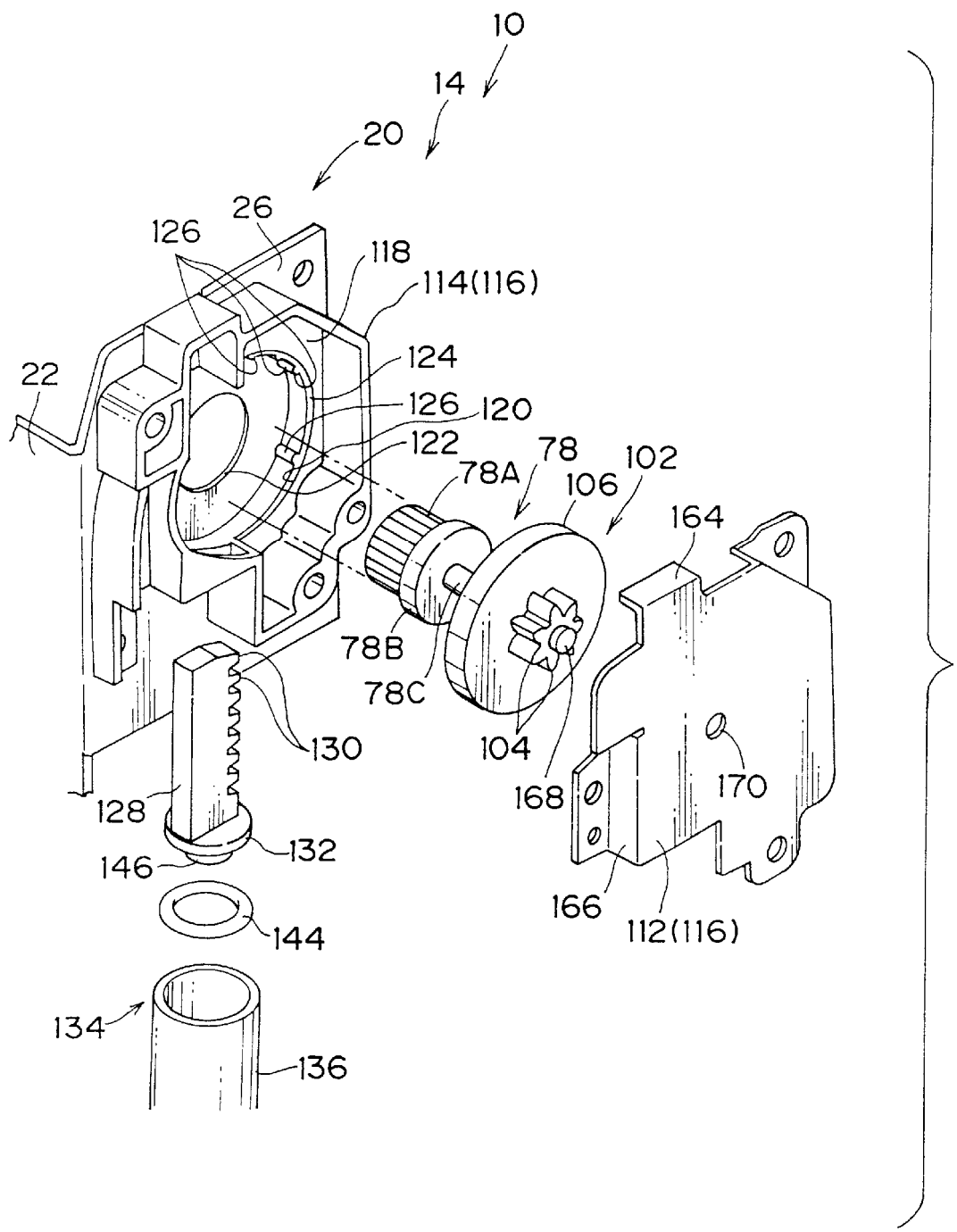
FIG. 14 is an exploded perspective view of a pretensioner, as seen from an angle different from that of FIG. 2.

As shown in FIG. 14, the pretensioner 14 including the above-described clutch portion 106 comprises a casing 116 structured by a cover 112 made of a metal and fixed to the leg plate 26 by means of a fastening device such as a screw or the like, and a casing body 114 formed by a synthetic resin material having a lower rigidity than that of the cover 112 and the leg plate 26. The casing body 114 of the casing 116 has a thickness direction in the same direction as the thickness direction of the leg plate 26, and includes a bottom portion 118 disposed adjacent to the leg plate 26 and towards the exterior in the thickness direction of the leg plate 26. A hole portion 120 having a larger diameter than that of the clutch portion 106 is formed in the bottom portion 118 coaxially with a circular hole 122. On one side from the center of the hole portion 120 along the width direction of the leg plate 26, the inner diameter dimension of the hole portion 120 is slightly larger than the outer diameter of a ring-form bearing body 124 as a bearing portion molded coaxially with the circular hole 122, and projecting from the end face outward in the depth direction of the circular hole 122. In a state in which the casing body 114 is attached to the circular hole 122, the outer peripheral portion of the bearing body 124 comes into contact with the inner peripheral portion of the hole portion 120.

Here, the bearing body 124 has a dimension in the axial direction set so as to face the outer peripheral portion of the clutch portion 106 along the radial direction in a state in which the spool 70 is assembled to the frame 20. The inner diameter dimension of the bearing body 124 is slightly larger than the outer diameter of the clutch portion 106. When the clutch 106 is coaxially disposed with respect to the bearing body 124, a gap S (see FIG. 15) is formed between the inner peripheral portion of the bearing body 124 and the outer peripheral portion of the clutch portion 106.

Moreover, with this webbing retractor 10, a plurality of protrusions 126 are formed on the inner peripheral portion of the bearing body 124. These protrusions 126 have a longitudinal direction along the axial direction of the bearing body 124, and when seen along the axial direction of the bearing body 124 (in a state shown in FIG. 15), the protrusions 126 have a semi-circular shape or a triangular shape (in this embodiment, a triangular shape). The triangular shape has an apex inward in the radial direction of the bearing body 124. The protrusions 126 are formed to be substantially uniform along the axial direction of the bearing body 124.

Figure 15:
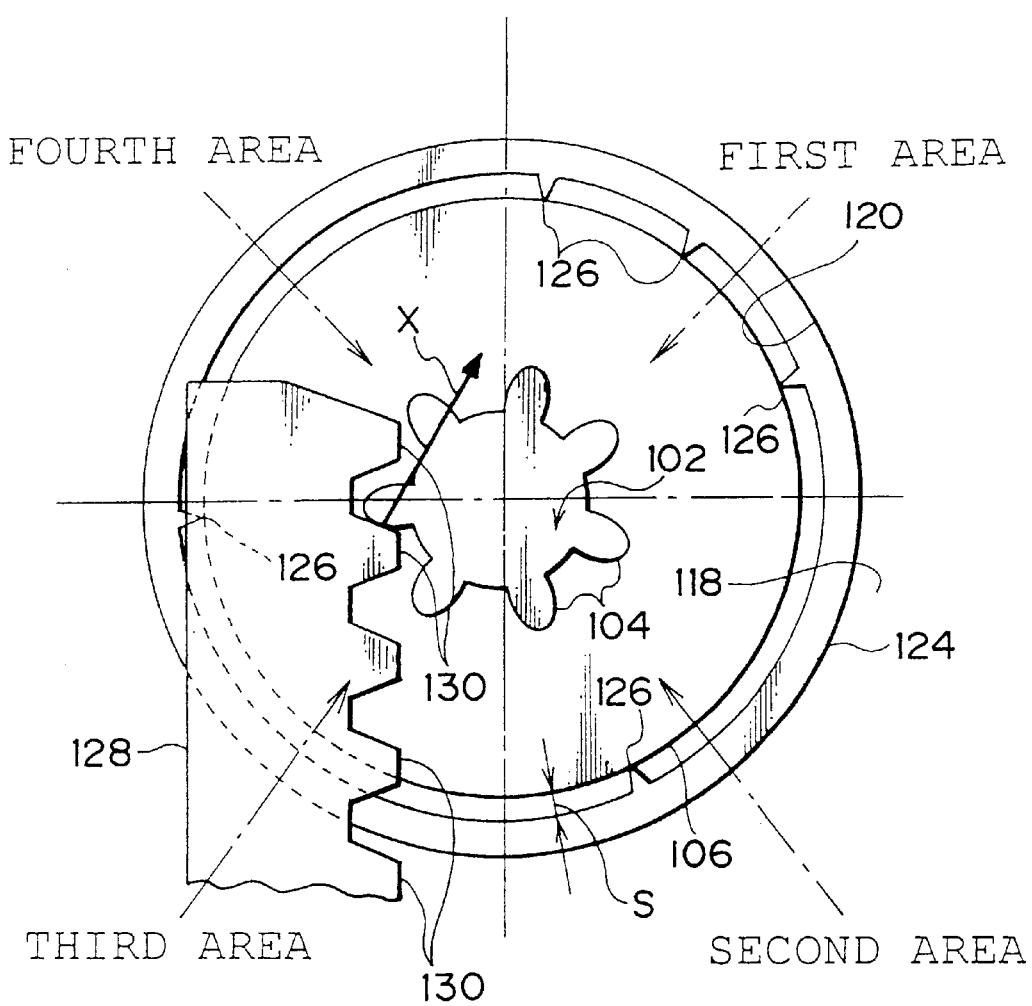
FIG. 15 is a diagram showing the position for forming protrusions.

Moreover, as shown in FIG. 15, the protrusions 126 are not formed at constant intervals along the inner peripheral direction of the bearing body 124. When the bearing body 124 is divided into four areas about the center (specifically, divided into a first area to a fourth area divided by dashed lines in FIG. 15), the protrusions are mainly formed in the area (the first area in FIG. 15) axially symmetrical to the area including an abutting portion in a state in which the teeth 130 of the rack bar 128, which will be described later, and the pinion teeth 104A of the pinion 102 are meshed (the third area in FIG. 15) (that is, there are more protrusions 126 formed in the first area than in the second to the fourth areas).

The dimension from the inner peripheral portion of the hole portion 120 to an end portion of the protrusion 126 inward in the radial direction of the hole portion 120 is generally equal to a dimension of the gap S described above. That is, designating the center of the hole portion 120 as an axis, the radius of an imaginary circle connecting the end portions of the protrusions 126 around this axis is generally equal to the outer diameter of the clutch portion 106. In a state in which the webbing retractor 10 is assembled, the end portions of the protrusions 126 come into contact with an outer peripheral portion the clutch portion 106, and the bearing body 124 pivotally supports the clutch portion 106 (that is, the opposite end in the longitudinal direction of the spool 70) via the protrusions 126. Here, as described above, as seen along the axial direction of the bearing body 124 (in a state shown in FIG. 15), the protrusions 126 are in a semi-circular shape or a triangular shape having an apex inward in the radial direction of the bearing body 124. Hence, the contact state of the end portions of the protrusions 126 and the outer peripheral portion of the clutch portion 106 in the assembled state of the webbing retractor 10 is a state in which the end portions of the protrusions 126 uniformly come into linear contact with the outer peripheral portion of the clutch portion 106 along the axial direction of the bearing body 124.

That is, in the webbing retractor 10, the clutch portion 106 is pivotally supported in a state in which the clutch portion 106 comes into linear contact with the end portions of the protrusions 126. Since the clutch portion 106 is pivotally supported in the state in which the clutch portion 106 comes into linear contact with the protrusions 126, even if the clutch portion 106 rotates in the state of being eccentric with respect to the bearing body 124 along the radial direction thereof, the protrusions 126 are gradually plastically deformed from the end portion in the rotational direction of the spool 70, while being dragged toward the rotational direction due to the friction resistance with the clutch portion 106. Hence, the spool 70 can smoothly rotate.

Moreover, as described above, the inner diameter of the bearing body 124 is slightly larger than the outer diameter of the clutch portion 106, and the gap S (see FIG. 15) is formed between the inner peripheral portion of the bearing body 124 and the outer peripheral portion of the clutch portion 106. Therefore, the plastically deformed portion of the protrusion 126 dragged by the rotating clutch portion 106 only enters the gap S, and the plastically deformed portion does not become a resistance to the rotation of the clutch portion 106. In this sense, the clutch portion 106 can smoothly rotate.

Furthermore, as shown in FIG. 2, the pretensioner 14 comprises a cylinder 134 accommodating a piston 132 therein. The cylinder 134 comprises a cylinder body 136 in a cylindrical form having a bottom and an open upper end, with an axis in the direction orthogonal to the axial direction of the spool 70, and a cylindrical generator receiving portion 138 integrally provided on an outer peripheral wall of the cylinder body 136. As a whole, the cylinder 134 is substantially in a J-shaped form as seen from the front.

Figure 16:
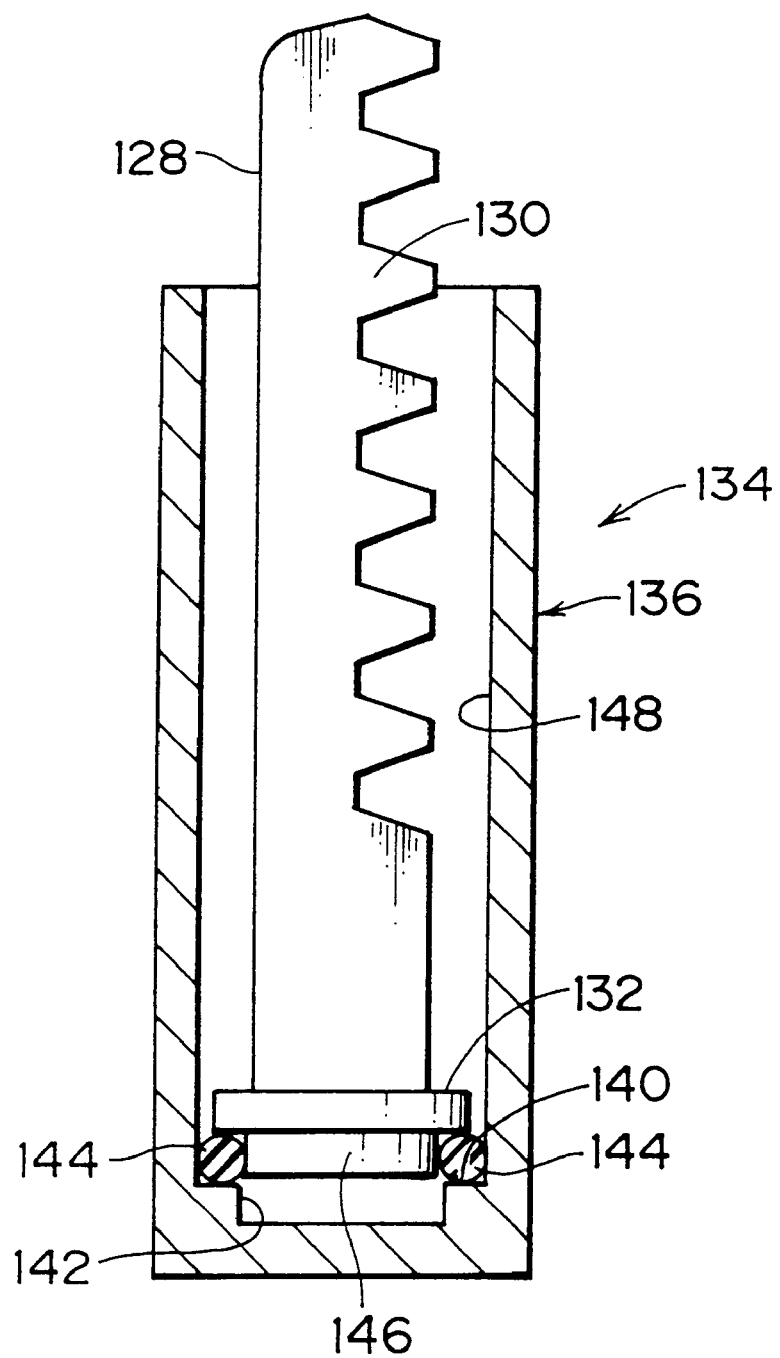
FIG. 16 is a sectional view showing structure of a cylindrical body of a cylinder.

As shown in FIG. 16, a recess 142 whose opening has a cross-section of a circular shape is provided in the bottom portion 140 of the cylinder body 136. This recess 142 has a smaller diameter than the inner diameter of the cylinder body 136, and the bottom portion 140 and the recess 142 are stepped, to thereby become a positioning and holding position for an O-ring 144, which will be described later.

The O-ring 144 is a member formed in a ring form with a rubber material or a synthetic resin material having an elasticity of a rubber material. The O-ring 144 is fitted to a seal holding portion 146 in a columned shape formed on an end face of the piston 132 towards the bottom portion 140, and forms a seal between the piston 132 and the inner wall 148 of the cylinder body 136.

Moreover, the O-ring 144 abuts against the bottom portion 140 in a state in which the piston 132 cannot abut directly against the bottom portion 140, and the position of the piston 132 in this state is the initial position of the piston 132. Here, in a normal state in which the O-ring 144 abuts against the cylinder bottom portion 140, the seal holding portion 146 is located within the recess 142 described above. Moreover, the recess 142 is set to have a depth such that the seal holding portion 146 does not abut against the bottom of the recess 142, when the O-ring 144 is elastically deformed.

That is, by having the above-described structure, the O-ring 144 is fitted to the outer peripheral portion of the seal holding portion 146 integrally formed on the face of the bottom portion 140 side of the piston 132, and the piston 132 is inserted into the cylinder 134 together with the O-ring 144. Hence, cutting for forming a seal holding groove, which has been used in conventional pretensioners, is not necessary. Further, the operation for attaching the O-ring in the seal holding groove by enlarging the diameter of the O-ring is not necessary.

Figure 17:
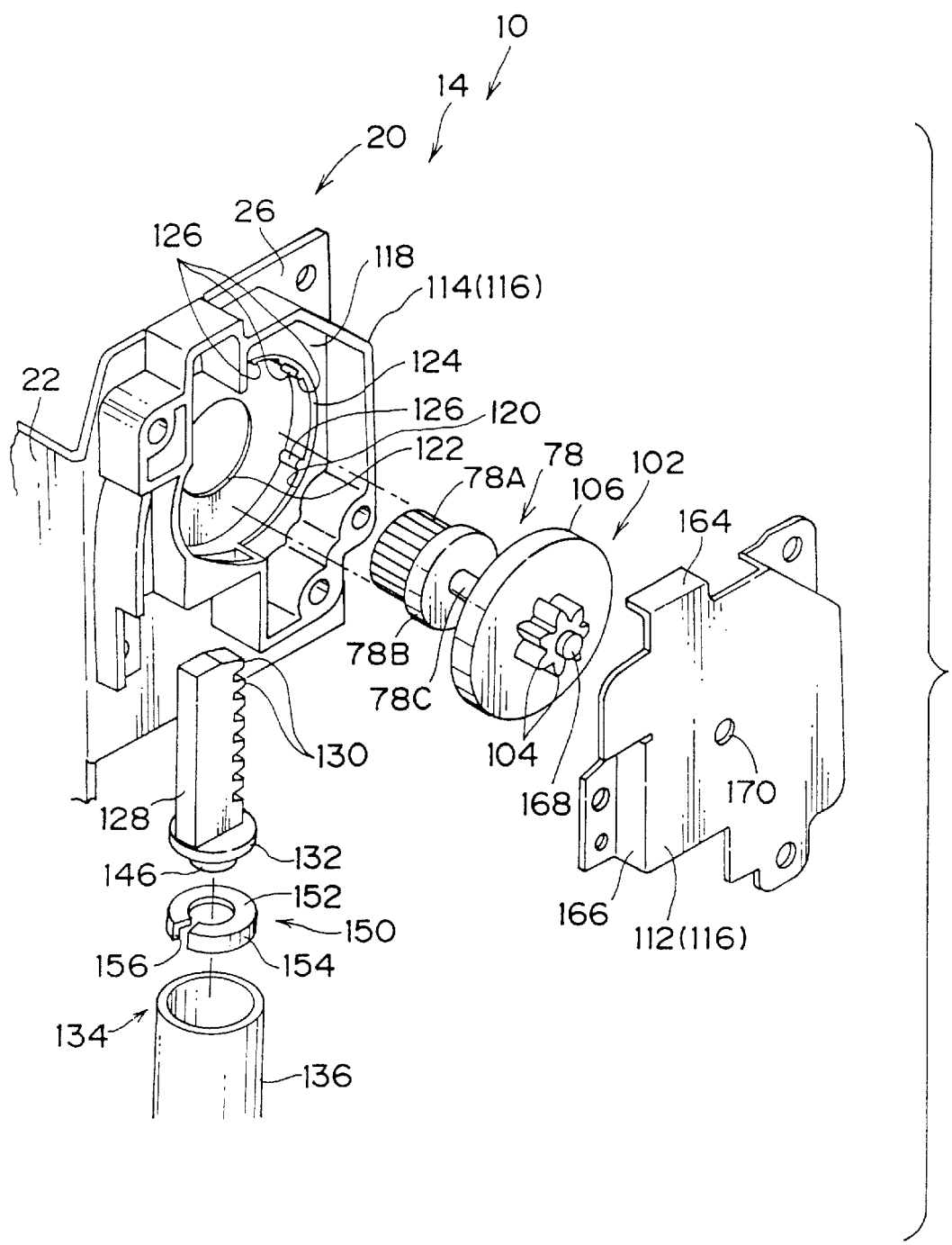
FIG. 17 is an exploded perspective view corresponding to FIG. 14, showing a variation example of the pretensioner.
Figure 18:
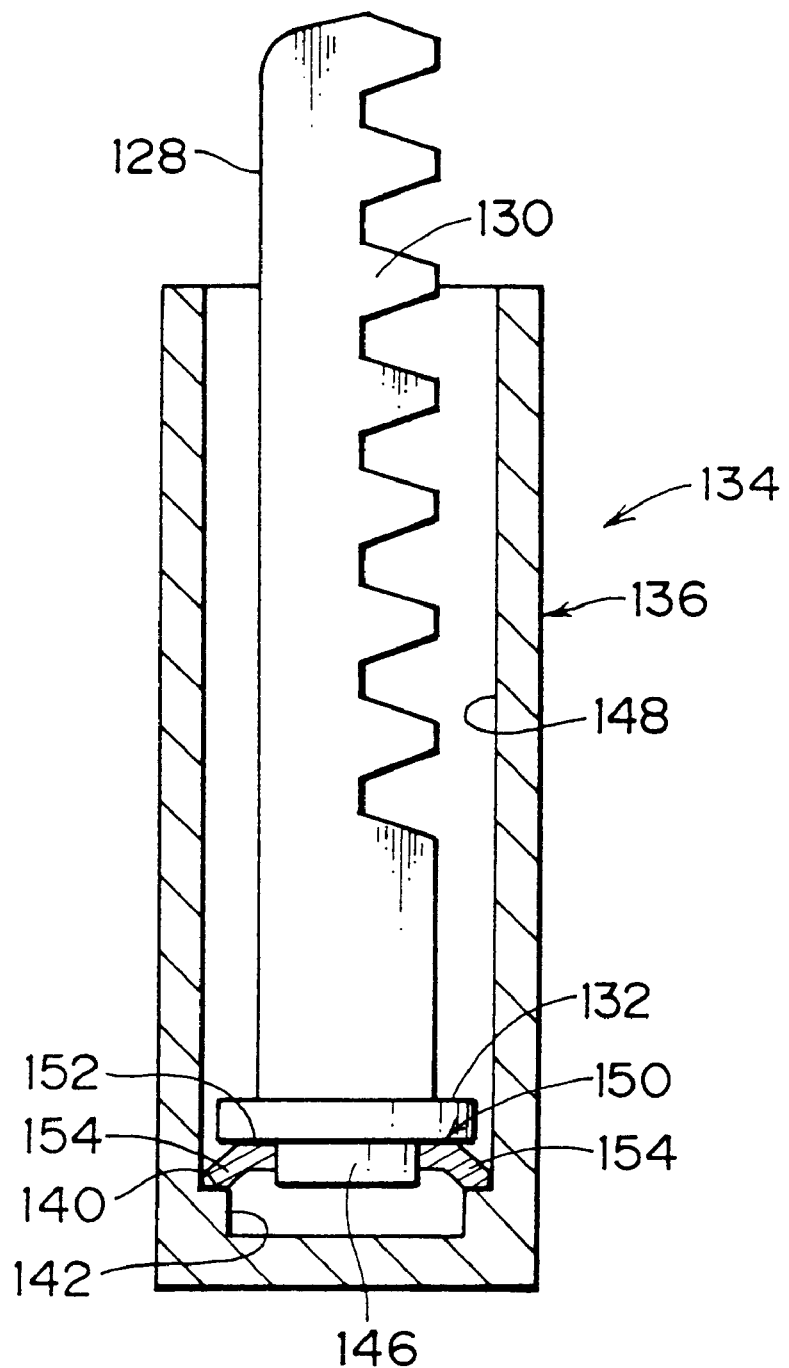
FIG. 18 is a sectional view corresponding to FIG. 16, showing a variation example of the pretensioner.

In this embodiment, the ring-shaped O-ring 144 is used. However, for example, as shown in FIG. 17 and FIG. 18, a piston ring 150 may be used instead of the O-ring 144. The structure of this piston ring 150 will now be described briefly. The piston ring 150 is substantially in a cylindrical form as a whole, and comprises a substantially ring-shaped upper wall portion 152 and a side wall portion 154 extending vertically downward from an outer peripheral portion of the upper wall portion 152. The upper wall portion 152 of the piston ring 150 is fitted to the outer peripheral portion of the seal holding portion 146 of the piston 132 described above. Thereby, the piston ring 150 is held by the piston 132. Moreover, the side wall portion 154 of the piston ring 150 abuts against the inner wall 148 of the cylinder body 136 described above, and the lower end of the side wall portion 154 of the piston ring 150 abuts against the receiving portion 148A formed integrally with the inner wall 148.

The piston ring 150 has a elasticity, and hence, if gas is supplied to the cylinder body 136, the piston ring 150 is pressed against the bottom face of the piston 132 due to this gas pressure. Thereby, the diameter of the piston ring 150 is enlarged, and the side wall portion 154 of the piston ring 150 is pressed against the inner wall 148 of the cylinder body 136. Accordingly, at the time of operation of the pretensioner, the piston ring 150 seals the portion between the piston 132 and the inner wall 148 of the cylinder body 136. Moreover, a continuous gap portion 156 is formed in the piston ring 150 from the upper wall portion 152 to the side wall portion 154, and gas can flow out from the bottom face side to the upper face side of the piston 132 through this gap portion 156. Therefore, severe increase in the gas pressure in the cylinder body 136 can be prevented. Furthermore, by setting the melting point of the material forming the piston ring 150 to be not higher than the ignition temperature of the gas generating agent, the piston ring 150 is partially softened (liquefied), at the time of operation of the pretensioner under a high temperature such as during a fire, and the gas flows out from the bottom face side to the upper face side of the piston 132. Thereby, it is also possible to have such a structure in which severe increase in the gas pressure in the cylinder body 136 under a high temperature can be prevented.

On the other hand, as shown in FIG. 2, the generator receiving portion 138 has an axial direction inclined with respect to the axial direction of the cylinder body 136, and is open at a side opposite to the portion connected with the cylinder body 136. Inside of the generator receiving portion 138, a gas generator 158 is disposed. Inside the gas generator 158, there are housed an activation device, a detonator, a booster, a gas generating agent and the like (none of which are shown). The activation device operates to ignite the detonator, to burn the gas generating agent via the booster. Thereby, a predetermined amount of gas is generated in a very short period of time.

Moreover, a cap 160 is screwed to the open end of the generator receiving portion 138, to prevent the gas generator 158 from coming off at the time of blowoff of the gas.

Furthermore, at a portion connecting the generator receiving portion 138 and the cylinder body 136, the inside of the generator receiving portion 138 communicates with the inside of the cylinder body 136, and the gas generated in the gas generator 158 is supplied to the inside of the cylinder body 136. The piston 132 moves due to this gas pressure.

On the other hand, the rack bar 128 is integrally formed with the piston 132. The rack bar 128 has a longitudinal direction along the axial direction of the cylinder 134, and at one end portion thereof in the width direction, a gear portion 162 comprising a plurality of teeth 130 is formed. The teeth 130 of the gear portion 162 are formed meshably with the pinion teeth 104A of the pinion 102.

As shown in FIG. 14, in the cover 112, there is formed a stopper portion 164 bent substantially at a right angle from an upper end portion of the cover 112 towards the frame 20, corresponding to a tip portion of the rack bar 128. The stopper portion 164 is for restricting upward movement of the rack bar 128 exceeding a predetermined distance, and for restraining the rack bar 128 from jumping out or the like. Moreover, there is formed a stopper portion 166 bent substantially at a right angle from a side portion of the cover 112 towards the frame 20, facing one end portion in the width direction of the rack bar 128. The stopper portion 166 is at the side of the rack bar 128 opposite the pinion 102, and is for restricting displacement of the rack bar 128 due to the pressing reaction force from the pinion 102. Furthermore, since the cover 112 having these stopper portions 164 and 166 formed therein is formed with a metal, rigidity thereof is high compared to a case where the cover 112 is formed by a synthetic resin material, so that the above-described restriction can be performed reliably.

Furthermore, a shaft 168 is formed in the axial center of an end face of the pinion 102, which end face is on the side oppsite the clutch portion 106, and is pivotally supported by a bearing hole 170 formed in the cover 112.

[Construction of the Urging Section 16]

As shown in FIG. 2, the urging section 16 is provided at the side of the pretensioner 14 having the above structure. This urging section 16 comprises a cover 172. The cover 172 is in a round box shape having a shallow bottom, opening toward the leg plate 26. Inside the cover 172, a spiral coil spring 174 as urging means is arranged. A distal end outward in the spiral direction of the spiral coil spring 174 is engaged to a predetermined position of the cover 172, and a distal end inward in the spiral direction thereof is engaged with a rotation shaft body 176. The rotation shaft body 176 is pivotally supported by a cover attachment board 178, which is a cover holding body disposed on the leg plate 26 side of the cover 172, and is coaxially fitted to the above-described sleeve 78 so as to be integral therewith. Therefore, with the rotation of the spool 70 in the direction for pulling out the webbing belt 68 (see FIG. 5), the sleeve 78 rotates, and further the rotation shaft body 176 rotates. Thereby, the spiral coil spring 174 is wound, to generate urging force of the spiral coil spring 174, which urges the spool 70 in the direction for taking up the webbing belt 68 via the rotation shaft body 176 and the sleeve 78.

Figure 19:
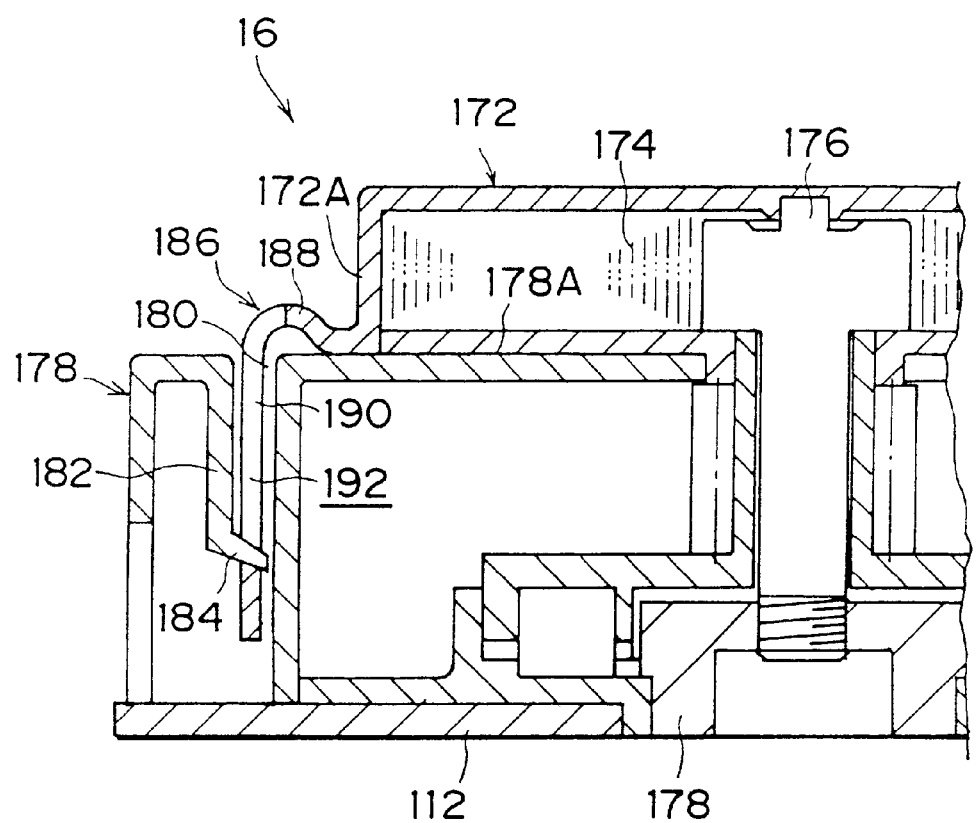
FIG. 19 is a sectional view showing structure of an urging section.
Figure 20:
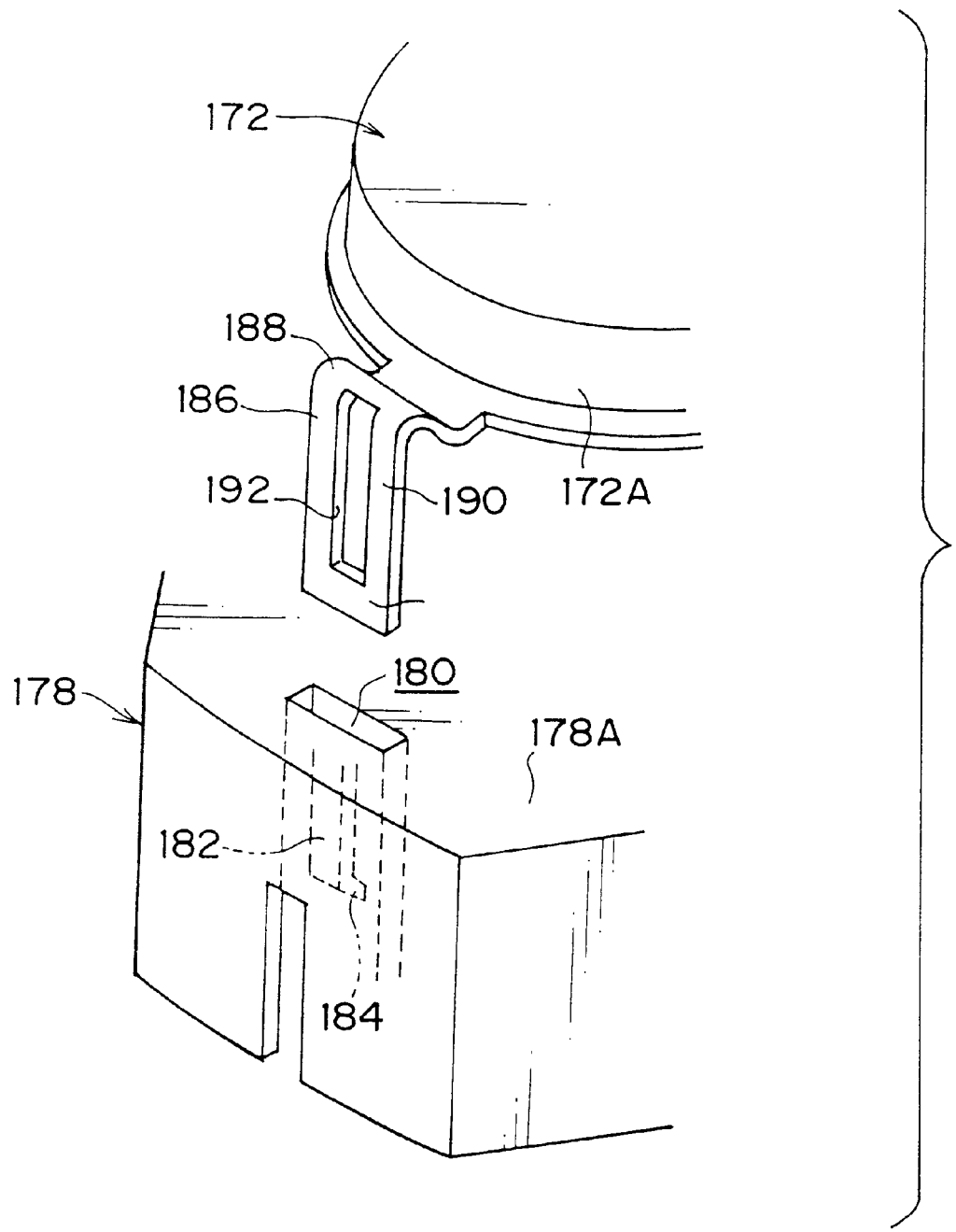
FIG. 20 is an exploded perspective view showing a main part of the urging section.

Furthermore, as shown in FIG. 19 and FIG. 20, a hole portion 180 is formed as an engagement hole portion in a predetermined position near the outer peripheral portion of the cover attachment board 178. At a distal end of a folding member 182 having elasticity for forming the hole portion 180, a pawl portion 184 as an engagement portion is formed. On the other hand, an engagement pawl 186 having elasticity is formed at a predetermined position on the outer peripheral side of the cover 172. The engagement pawl 186 comprises of a deforming portion 188 having a shape of first curving upward (in FIGS. 19 and 20) from the outer peripheral portion of the cover 172, and then turning downward and an engagement portion 190 extending downward continuously from the deforming portion 188. In the engagement portion 190, a rectangular hole portion 192 is formed extending in the longitudinal direction.

[Construction of the Lock Device 18]

On the other hand, as shown in FIG. 1 and FIG. 3, the lock device 18 is disposed at the side of the above-described leg plate 24. The lock device 18 comprises the above-described lock base 82. To describe in detail the structure of the lock base 82: as shown in FIG. 3, the lock base 82 is formed in a shape of a cylinder with a collar, and comprises a base portion 82A fitted to the recess body 80A of the lock base receiving portion 80, an intermediate portion 82B having a larger diameter than the base portion 82A and fitted to the recess end portion 80B of the lock base receiving portion 80, and a holding portion 82C having a larger diameter than the intermediate portion 82B and disposed at the outer face of the flange portion 70B in a state of abutting against the flange portion 70B. Moreover, in a portion in the lock base 82 excluding an end of the shaft core portion, there is formed a fitting hole 94 in a hexagonal hole shape. In the end of the shaft core portion, there is formed a small hole 202 communicating mutually with the shaft core portion of the fitting hole 94 and having a smaller diameter than the fitting hole 94.

Figure 21:
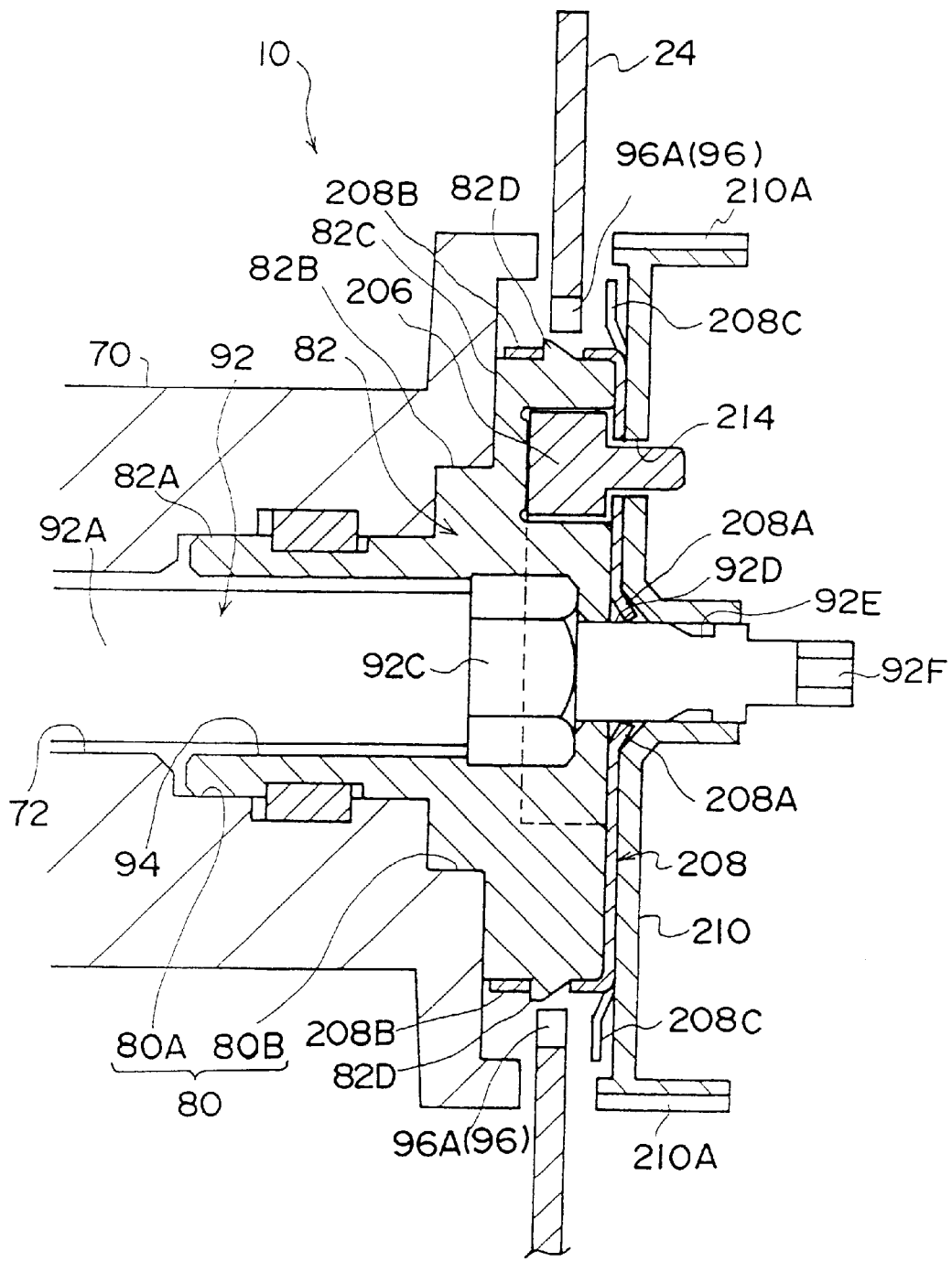
FIG. 21 is a sectional front view wherein the vicinity of a lock device of a webbing retractor according to the embodiment of the present invention is enlarged.

As shown in FIG. 21, the ratchet hole 96 is formed by blanking on the upper side of the leg plate 24 of the frame 20 described above. The ratchet teeth 96A of the ratchet hole 96 is set to have a high strength.

Figure 27:
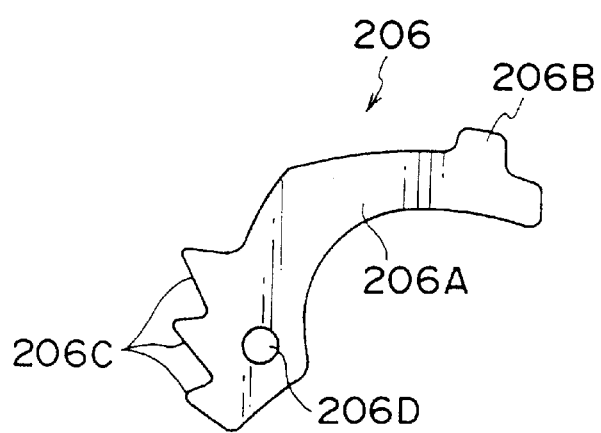
FIG. 27 is an elevation of a lock plate.

Inside of this ratchet hole 96, the holding portion 82C of the lock base 82 is disposed. In addition, the small diameter portion 92D of the torsion shaft 92 is inserted into the above-described small hole 202 formed in the shaft core portion of the holding portion 82C. On a front side of the holding portion 82C, there is formed a concave shaped receiving portion 204 (see FIG. 25, FIG. 26, FIG. 28 and FIG. 29) formed around the peripheral portion of the small hole 202. One end portion of the receiving portion 204 is closed, but the other end portion of the receiving portion 204 is open. The open end portion of the receiving portion 204 of the holding portion 82C in the lock base 82 is chamfered so that it does not hamper the operation of engaging the lock plate 206, which will be described later, with the ratchet hole 96. A single lock plate 206 (see FIGS. 27 to 29), substantially in a shape of an arc plate as a whole, and serving as a component of the lock device 18, is received in this receiving portion 204.

The lock plate 206 comprises a plate body 206A made of a metal substantially in a shape of an arc plate, a rectangular protrusion 206B extended from one end of the plate body 206A, lock teeth 206C having a high strength, formed on an outer peripheral portion of the other end of the plate body 206A and meshing with the ratchet teeth 96A of the ratchet hole 96 of the leg plate 24, and a guide pin 206D standing from the lock teeth side end of the plate body 206A. The length produced by adding the width of the plate body 206A and the projecting length of the protrusion 206B is substantially equal to the width of the wide width portion 204A of the receiving portion 204 of the lock base 82.

Moreover, on an outer side of the holding portion 82C of the lock base 82, there is attached a lock cover 208 in a thin disk shape in a state of being prevented from rotating, for preventing the lock plate 206 from coming off.

Figure 22:
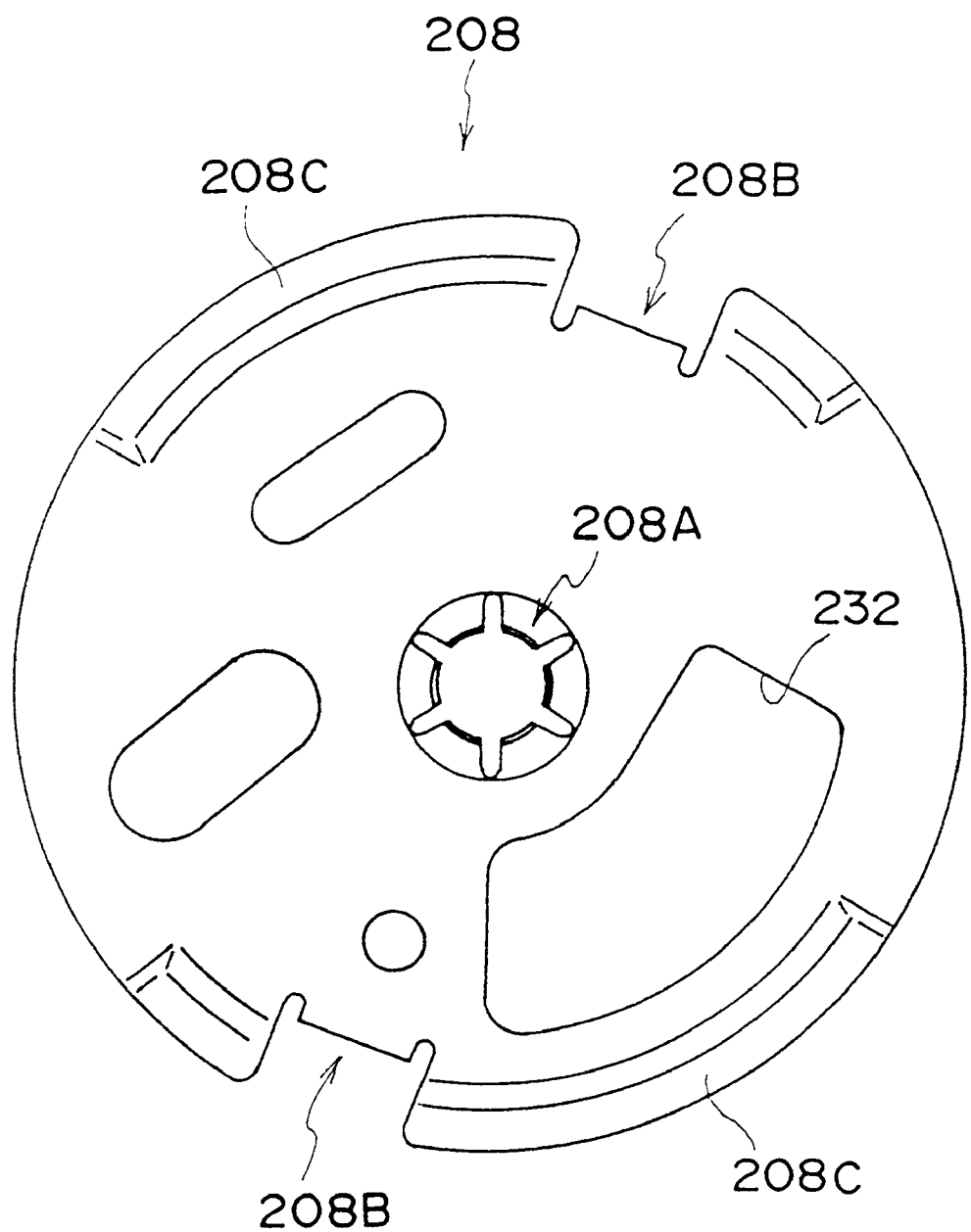
FIG. 22 is a plan view of a lock cover.
Figure 23:
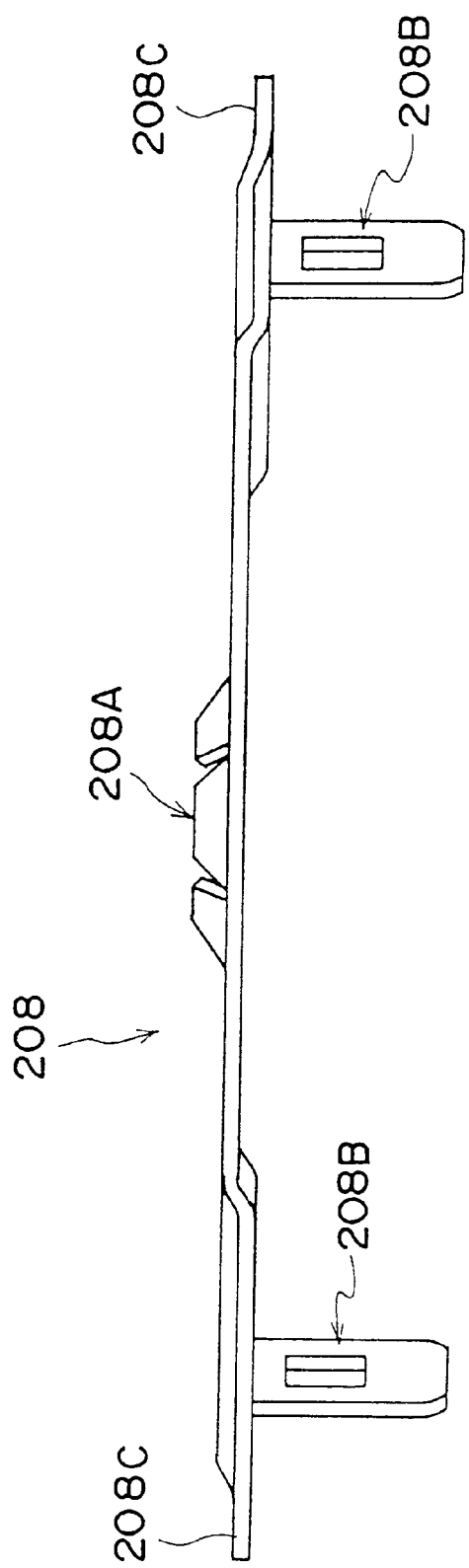
FIG. 23 is a side view of the lock cover.
Figure 24:
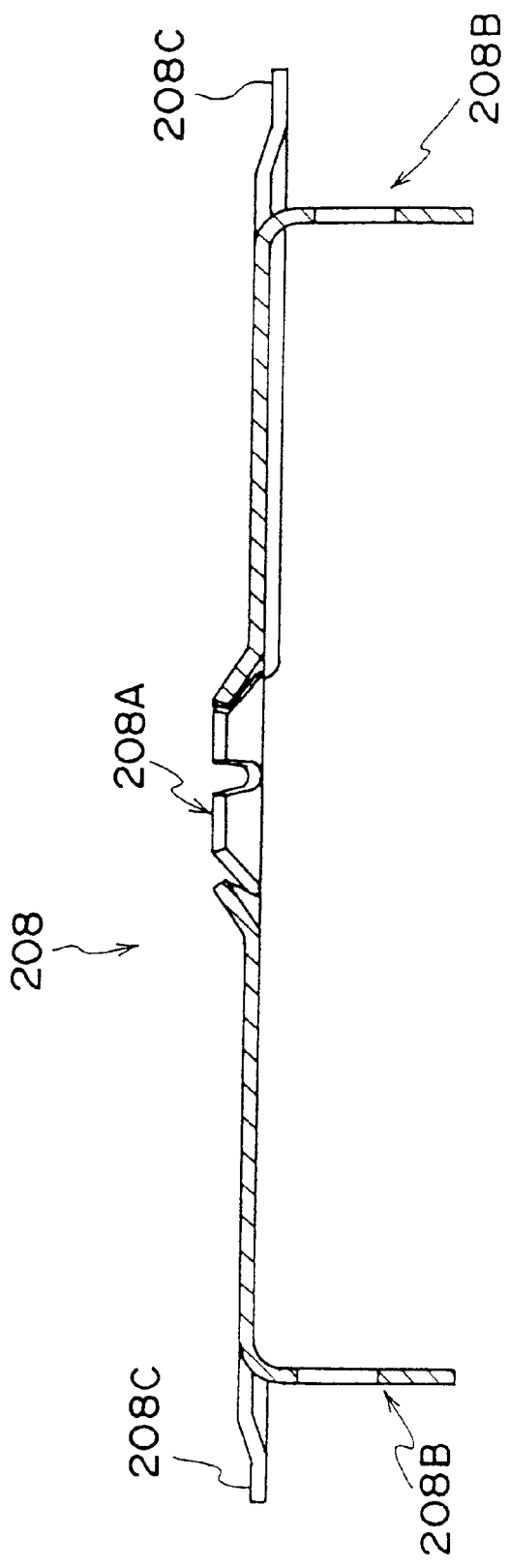
FIG. 24 is a side sectional view of the lock cover.

As shown in FIGS. 22 to 24, the lock cover 208 is formed in a disk shape as a whole, and a push nut portion 208A is formed by being cut and raised in a form of pawls in a central portion of the lock cover 208. This push nut portion 208A is engaged with the distal end portion of the torsion shaft 92. Moreover, each of a pair of hook portions 208B is extended from sides opposite each other of the peripheral portion of the lock cover 208. As shown in FIG. 21, these hook portions 208B are engaged with engagement protrusions 82D provided in the lock base 82. That is, the lock cover 208 is attached in a state in which it covers the lock base 82 and the lock plate 206 such that the push nut portion 208A is engaged with the torsion shaft 92, and the hook portion 208B is engaged with the engagement protrusion 82D of the lock base 82.

Furthermore, an outer peripheral flange portion 208C is provided on the outer peripheral edge of the lock cover 208. This outer peripheral flange portion 208C overlaps the leg plate 24. That is, the lock cover 208 covers the lock base 82 and the lock plate 206 by the leg plate 24 being placed between the spool 70 and the lock cover 208.

Figure 25:
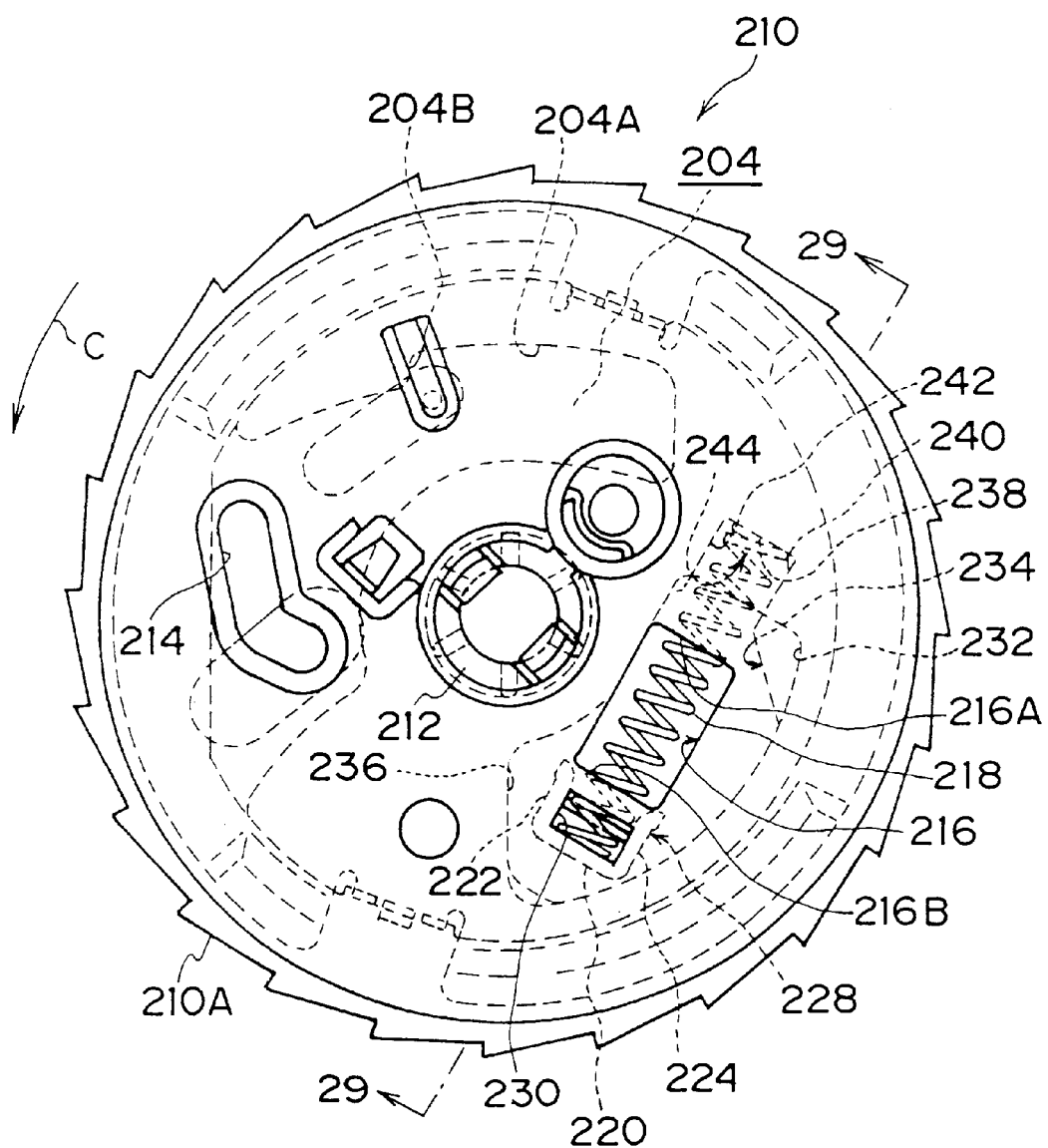
FIG. 25 is a plan view of a V gear.
Figure 26:
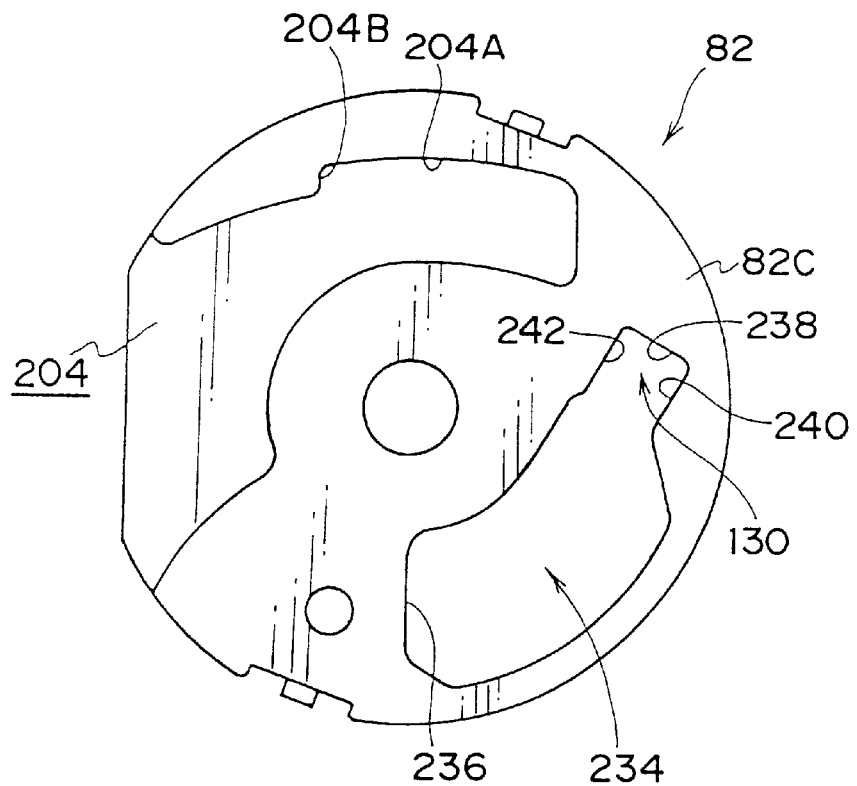
FIG. 26 is a side view of a lock base.

At a position adjoining the above-described lock base 82, a V gear 210 is disposed. The V gear 210 structures a portion of the lock device 18, and is a rotational body in a substantially disk-shaped form, with a larger diameter than the lock base 82. As shown in FIG. 25, a cylindrical boss 212 is formed in the shaft core portion of the V gear 210, pivotally supported by the gear holding portion 92E of the torsion shaft 92, so as to be able to follow the torsion shaft and rotate. Moreover, a substantially v-shaped guide hole 214 is formed in the V gear 210, and the guide pin 206D arranged standing from the lock plate 206 is inserted in the guide hole 214. Further, the lock teeth 210A are integrally formed on the outer peripheral portion of the V gear 210.

Figure 28:
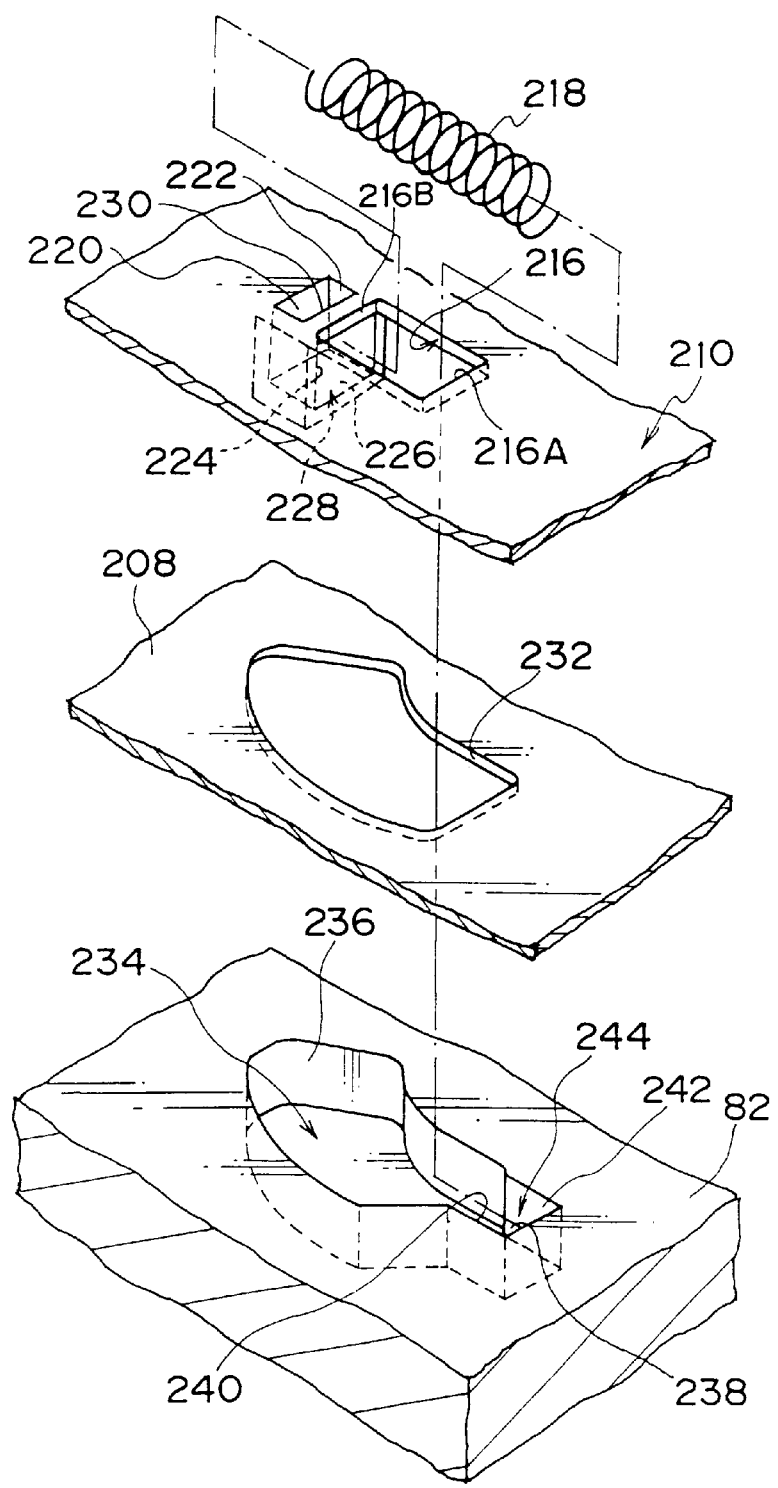
FIG. 28 is an exploded perspective view showing a main part of a portion for accommodating a compression coil spring.

As shown in FIG. 28 and FIG. 29, a rectangular insertion hole 216 is formed between the center and an outer peripheral portion of the V gear 210, penetrating through along the thickness direction of the V gear 210. The insertion hole 216 is in an oblong shape whose longitudinal direction is along an imaginary line connecting both ends of an imaginary arc formed by the portion on the opposite side of the center of the V gear 210 with respect to the portion where the insertion hole 216 is formed. The whole length of the insertion hole 216 in the longitudinal direction is shorter than the natural length of the compression coil spring 218, and is longer than the whole length of the compression coil spring 218 when it is compressed to stick totally, or is the same length as the whole length of the compression coil spring 218 when it sticks totally. Moreover, the dimension of the insertion hole 216 in the width direction is longer than the outer diameter of the compression coil spring 218.

Furthermore, a wall portion 220 is formed as a wall portion (one wall portion) on the rotation body side, on an end face facing the lock base 82 in the assembled state of the V gear 210. Among both end portions in the longitudinal direction of the insertion hole 216 described above, an end portion 216B is relatively towards the take-up direction, which is the rotational direction of the spool 70 when the webbing belt 68 is wound by the spool 70. The wall portion 220 is formed at t position that is separated from the end portion 216B by a predetermined distance along the longitudinal direction of the insertion hole 216, and is at the side of the end portion 216B which side is opposite the other end portion 216A.

The distance from the end portion 216B of the insertion hole 216 to the wall portion 220 is such that when added to the dimension in the longitudinal direction of the insertion hole 216, the sum (that is, the distance from the wall portion 220 to the other end portion 216A in the longitudinal direction of the insertion hole 216) is sufficiently shorter than the natural length of the compression coil spring 218.

A pair of restriction walls 222 and 224 are formed toward the end portion 216B of the insertion hole 216 on both end portions in the width direction of the wall portion 220. Moreover, a restriction wall 226 is formed as a restricting portion, from an end portion on a side opposite a portion connecting the V gear 210 and the wall portion 220 so as to connect the restriction walls 222 and 224, to form a spring box 228 together with the restriction walls 222 and 224. Both the distance between the restriction wall 222 and the restriction wall 224, and the distance between the restriction wall 226 and the V gear 210 are slightly larger than the outer diameter of the compression coil spring 218. Inside of this spring box 228, one end side of the compression coil spring 218 in the axial direction (speaking in more detail, in the axial direction of a cylinder when the compression coil spring 218 is considered to be a cylinder in view of the outer shape) is accommodated, and in the accommodation state thereof, the one end portion in the axial direction of the compression coil spring 218 abuts against the spring box 228.

Moreover, a small window 230 in a long rectangular shape is formed in the V gear 210, penetrating through in the thickness direction thereof. The small window 230 has a longitudinal direction along the width direction of the insertion hole 216 described above, both end portions in the longitudinal direction corresponding to the restriction walls 222 and 224, and one end portion in the width direction corresponding to the restriction wall 226. That is, the small window 230 communicates the inside of the above-described spring box 228 and the opposite side of the spring box 228 with respect to the V gear 210, and from this opposite side, the vicinity of a bottom portion of the spring box 228 (that is, the restriction wall 226) can be seen.

On the other hand, in the lock cover 208 as described above, in the assembled state of the V gear 210, a through hole 232 substantially in a fan shape is formed, through which the spring box 228 penetrates. Not only can the spring box 228 penetrate through this through hole 232, but also in this penetration state, rotation of the spring box 228 at a predetermined angle is possible around the center of the V gear 210. Therefore, the V gear 210 is made relatively rotatable at a predetermined angle, coaxially with the lock cover 208.

Moreover, a spring receiving portion 234 is formed in the holding portion 82C of the above-described lock base 82 for receiving the spring box 228 and the compression coil spring 218 which have penetrated through the through hole 232 in the assembled state of the V gear 210.

The spring receiving portion 234 is in a concave shape having an open end on the side facing the lock base 82 and the V gear 210 in the assembled state of the V gear 210, and a part of the opening has substantially the same shape as that of the through hole 232. Of inner peripheral walls of the spring receiving portion 234, a portion located relatively in the pulling-out direction is a pressing wall 236. When the lock base 82 rotates in the take-up direction opposite to the pulling-out direction, the pressing wall 236 presses the spring box 228. On the other hand, an inner peripheral wall of the spring receiving portion 234 further in the take-up direction than an intermediate portion of the spring receiving portion 234 in the pulling-out direction (take-up direction) is a restriction recess 244 structured by restriction walls 240 and 242 as a restricting portion, which face each other, and a wall portion 238.

The dimension between the restriction wall 240 and the restriction wall 242 of the restriction recess 244 is slightly larger than the outer diameter of the compression coil spring 218. A part of the other end side in the axial direction of the compression coil spring 218 can be received between the restriction wall 240 and the restriction wall 242. Moreover, the bottom portion 238 of the restriction recess 244 generally faces the wall portion 220 along the longitudinal direction of the insertion hole 216 described above, and the other end portion in the axial direction of the compression coil spring 218 abuts against the wall portion 238 in the assembled state of the V gear 210, the lock base 82 and the compression coil spring 218.

Figure 32:
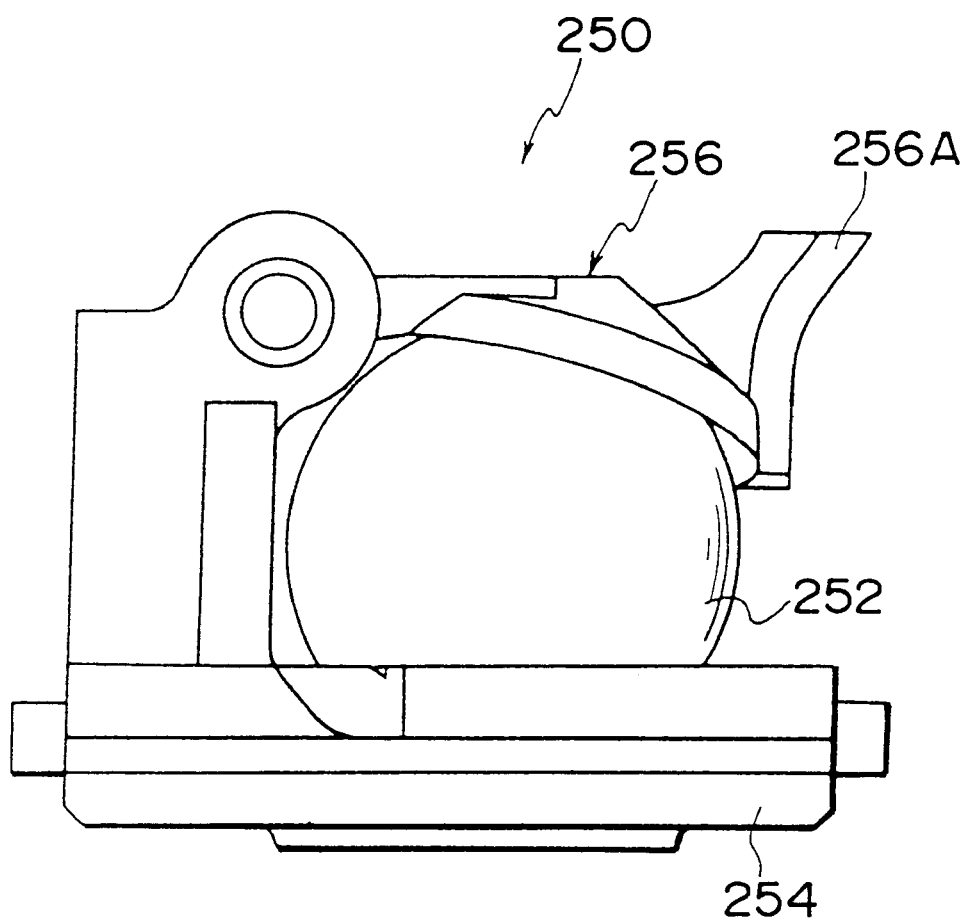
FIG. 32 is a side view of an acceleration sensor.

On the other hand, below the V gear 210, a known acceleration sensor 250 for the VSIR (see FIG. 1) is provided in a prescribed location. In FIG. 32, the acceleration sensor 250 is not shown. At the time of abrupt deceleration of the vehicle, a ball 252 as an inertial mass body of the acceleration sensor 250 moves by rolling on the sensor housing 254 and swings the sensor lever 256 serving as a restraining member, so that a lock pawl 256A of the sensor lever 256 is engaged with the lock teeth 210A of the V gear 210.

As shown in FIG. 32, the above-described acceleration sensor 250 is held by a sensor holder 258 made of a resin. A sensor cover 260 made of a resin having a similar shape as that of the sensor holder 258 is provided in a prescribed location outside of the sensor holder 258, and the sensor holder 258 and the sensor cover 260 are integrally fixed to the leg plate 24 of the frame 20. Moreover, a short cylindrical boss 258A is formed integrally with the shaft core portion of the sensor holder 258, and the boss 258A is pivotally supported by the tip portion 92F of the torsion shaft 92.

In addition, internal teeth engageable with an unillustrated pawl for the WSIR pivotally supported by the above-described V gear 210 is integrally formed at an inner peripheral portion of the above-described sensor holder 258.

Next is a brief description of operation of the webbing retractor 10 according to this embodiment.

When an occupant holds an unillustated tongue plate inserted in the webbing, pulls out the webbing belt 68 from the spool 70 against the urging force of the spiral coil spring 174, and engages the tongue plate with an unillustrated buckle, the occupant is in a state of wearing the webbing of a three-point seat belt system. That is, the webbing belt from an unillustrated shoulder anchor provided in a prescribed location on an upper portion of a center pillar to the tongue plate is the webbing belt of the shoulder side, and the webbing belt from the tongue plate to the buckle apparatus is the webbing belt of the lap side.

At the time of pulling out the webbing belt ordinarily, when the occupant pulls out the webbing belt, the spool 70 is rotated in the pulling-out direction, and the wall portion 238 which is a part of the inner peripheral walls of the spring receiving portion 234 of the lock base 82 provided integrally with the spool 70 presses the end portion in the axial direction of the compression coil spring 218 and compresses the compression coil spring 218. The compression coil spring 218 subjected to the pressing force from the wall portion 238 presses the wall portion 220, against which the one end portion thereof in the axial direction abuts, by means of its own elasticity, to rotate the V gear 210 in the pulling-out direction. Therefore, in the normal pulling out state, the V gear 210 follows the rotation of the spool 70.

From this state, the vehicle comes into the travelling state. Further, when the vehicle comes into the abrupt deceleration state, the activation device in the gas generator 158 operates to burn the gas generating agent via the booster. Thereby, a predetermined quantity of gas is generated in a very short period of time, and is supplied to the cylinder body 136. The piston 132 is moved by this gas pressure in a direction away from a bottom portion of the cylinder body 136, and the rack bar 128 is moved to slide in the direction away from the bottom portion of the cylinder body 136. The teeth 130 of the rack bar 128 are meshed with the teeth portion 104 of the pinion 102 by means of this sliding movement, and in this state the rack bar 128 is further moved to slide in the direction away from the bottom portion of the cylinder body 136 by means of the gas pressure described above. Hence, the teeth 130 of the rack bar 128 press the teeth portion 104 of the pinion 102 in the direction of an arrow X in FIG. 15 to thereby rotate the pinion 102. Thereby, the spool 70 formed integrally with the pinion 102 is rotated in a predetermined amount in the direction of winding the webbing belt 68, and the webbing belt 68 is wound by a length corresponding to rotation amount of the spool 70. Thereby, the restraining force applied to the occupant's body by means of the webbing belt 68 increases temporarily, to restrict movement of the occupant toward the front of the vehicle in the abrupt deceleration state of the vehicle.

By the way, when the teeth 130 of the rack bar 128 press the teeth portion 104 of the pinion 102, the teeth 130 tend not only to rotate the pinion 102, but also to displace the pinion 102 along the plane direction thereof, and to tend to displace (so as to make eccentric) the clutch portion 106 coaxially formed integrally with the pinion 102, along the plane direction thereof.

With the webbing retractor 10, as described above (as shown in FIG. 15), when the bearing body 124 is divided into the first area to the fourth area around the center thereof, there are more protrusions 126 formed in the area (the first area in FIG. 15) axially symmetrical to the area which includes the contact portion of the teeth 130 and the teeth portion 104 (the third area in FIG. 15). That is, in this case there are more protrusions 126 formed in the inner peripheral portion of the bearing body 124 in the portion where the inner peripheral portion of the bearing body 124 faces the outer peripheral portion of the clutch portion 106 generally along the direction of the contact face of the teeth 130 and the teeth portion 104, than in the inner peripheral portion corresponding to the other areas. The clutch portion 106 becomes eccentric to thereby press these protrusions 126. When the clutch portion 106 rotates, friction resistance proportional to the pressing force is generated, and the protrusions 126 tend to hinder the rotation of the clutch portion 106 by this friction resistance. However, since the protrusions 126 have lower rigidity than the clutch portion 106, and the protrusions 126 are only brought into linear contact with the clutch portion 106, when the spool 70 rotates in a state in which the above-described pressing force operates, the protrusions 126 cannot hinder the rotation of the clutch portion 106, and the protrusions 126 are gradually plastically deformed in the rotational direction of the spool 70 from the respective end portions thereof, while being dragged in the rotational direction of the spool 70, due to the friction resistance with the outer peripheral portion of the clutch portion 106. As described above, in this embodiment, when the clutch portion 106 rotates, the protrusions 126 do not resist the rotation, and are rather plastically deformed. Hence, even if the spool 70 becomes eccentric, the spool 70 can smoothly rotate.

Furthermore, as described above, the inner diameter of the bearing body 124 is set to be slightly larger than the outer diameter of the clutch portion 106, and the gap S (see FIG. 15) is formed between the inner peripheral portion of the bearing body 124 and the outer peripheral portion of the clutch portion 106. Hence, in the state in which the above-described pressing force operates, the plastically deformed portion of the protrusion 126 dragged by the clutch portion 106 due to the rotation of the spool 70 only enters the gap S, and the plastically deformed portion does not become a resistance against the rotation of the clutch portion 106. In this sense, the spool 70 can smoothly rotate.

As described above, with this embodiment, even if the spool 70 becomes eccentric, the spool 70 can smoothly rotate. Therefore, the gas pressure in the cylinder 136 is not consumed by the friction resistance between the clutch portion 106 and the protrusions 126, and is efficiently supplied for the rotation of the spool 70. Thereby, the quantity of the gas generating agent and the booster stored in the gas generator 158 can be made small, and the gas generator 158 itself and further the pretensioner 14 can be made small, thereby contributing to cost reduction.

Furthermore, with the webbing retractor 10, though the rack bar 128 moves upward due to the gas generation in the cylinder 136, movement of the rack bar 128 exceeding a predetermined distance is restricted because the stopper portion 164 abuts against the upper end portion of the rack bar 128. Thereby, the rack bar 128 can be restrained from jumping out. Here, in this embodiment, since the cover 112 is formed with a metal, the cover 112 has higher rigidity than a case in which the cover is formed by a synthetic resin material, and can reliably receive the rack bar 128 which moves upward, and for example, the rack bar 128 can be prevented from jumping out.

Moreover, when the rack bar 128 meshes with the pinion 102, as described above, since the teeth 130 of the rack bar 128 press the teeth portion 104 of the pinion 102 along the plane direction, the pressing reaction force from the teeth portion 104 of the pinion 102 acts on the teeth 130 of the rack bar 128, and the rack bar 128 is displaced toward the side opposite to the pinion 102 by this pressing reaction force. With the webbing retractor 10, the stopper portion 166 abuts against the rack bar 128, to restrict the displacement of the rack bar 128. As described above, furthermore, in this embodiment, since the cover 112 is formed a metal, the cover 112 has higher rigidity than the case in which cover is formed by a synthetic resin material, and the stopper portion 166 can reliably receive the load applied from the pinion 102 to the rack bar 128. Hence, excellent meshing performance between the rack bar 128 and the pinion 102 can be secured.

Moreover, as described above, with the webbing retractor 10, since the cover 112 has higher rigidity than the case in which the cover is formed by a synthetic resin material by forming the cover 112 by a metal, pivotal support of the shaft portion 88 becomes possible simply by forming the bearing hole 170 in the cover 112. That is, when the cover 112 is molded by a synthetic resin material, since the strength is in insufficient, a bearing member molded by a metal or the like has to be separately provided. However, in this embodiment, the rigidity of the cover 112 is high. Hence, simply by forming the bearing hole 170, the shaft 168 can be directly supported. Therefore, the cost can be reduced from a standpoint of the number of parts and machining.

Furthermore, since the casing body 114 structuring the casing 116 together with the cover 112 is formed by a synthetic resin material, it becomes possible to make the casing 116 lightweight. Further, generation of abnormal sound (bumping sound) resulting from the casing 116 being brought into contact with other metal parts due to vibration or the like during travelling of the vehicle can be suppressed or prevented.

In the above-described embodiment, the shape of the protrusion 126 as seen along the axial direction of the bearing body 124 is made to be a triangular shape, but from the viewpoint of the present invention according to the first aspect, the portion of the end portion of the protrusion 126 contacting the outer peripheral portion of the clutch portion 106 has only to be quite small. Therefore, a point contact, or if the contact point is quite small, even a face contact may be used.

In addition, in this embodiment, the structure is such that the protrusions 126 are formed on the inner peripheral portion of the bearing body 124. This is because the rigidity of the bearing body 124 is higher than that of the clutch portion 106. That is, if the rigidity of the clutch portion 106 is lower than that of the bearing body 124, protrusions corresponding to the protrusions 126 will be formed on the outer peripheral portion of the clutch portion 106.

On the other hand, as described above, when the pretensioner 14 operates to rotate the spool 70 via the sleeve 78 in the webbing take-up direction instantaneously, the abrupt deceleration state of the vehicle is detected by the acceleration sensor 250 substantially at the same time. That is, the ball 252 of the acceleration sensor 250 rolls on the sensor housing 254 to thereby swing the sensor lever 256. Thereby, the lock pawl 256A of the sensor lever 256 is engaged with the lock teeth 210A of the V gear 210, and the rotation of the V gear 210 in the webbing pulling-out direction is resisted.

Figure 30:
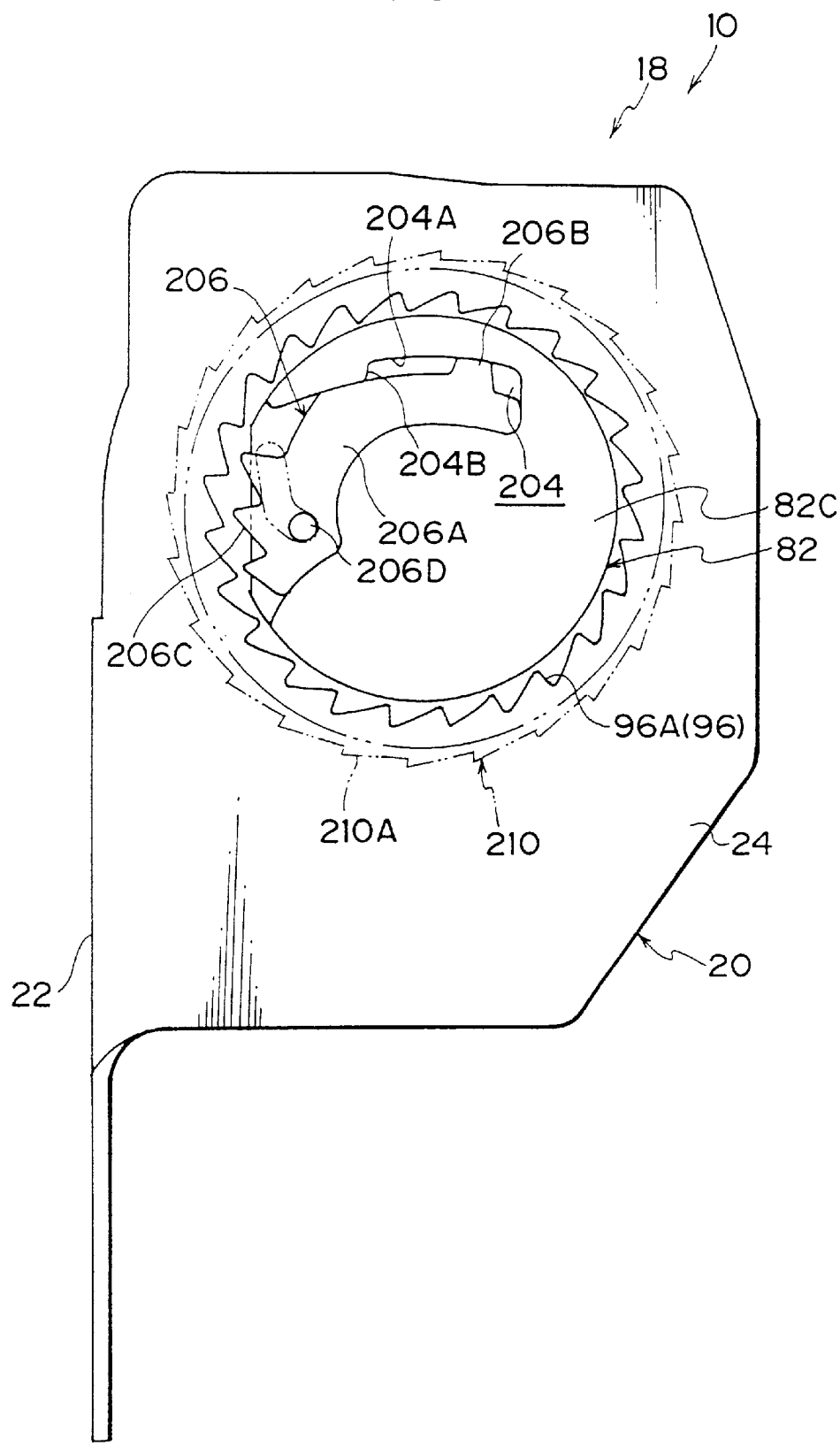
FIG. 30 is a side view showing an unlocked state of the webbing retractor according to the embodiment of the present invention.
Figure 31:
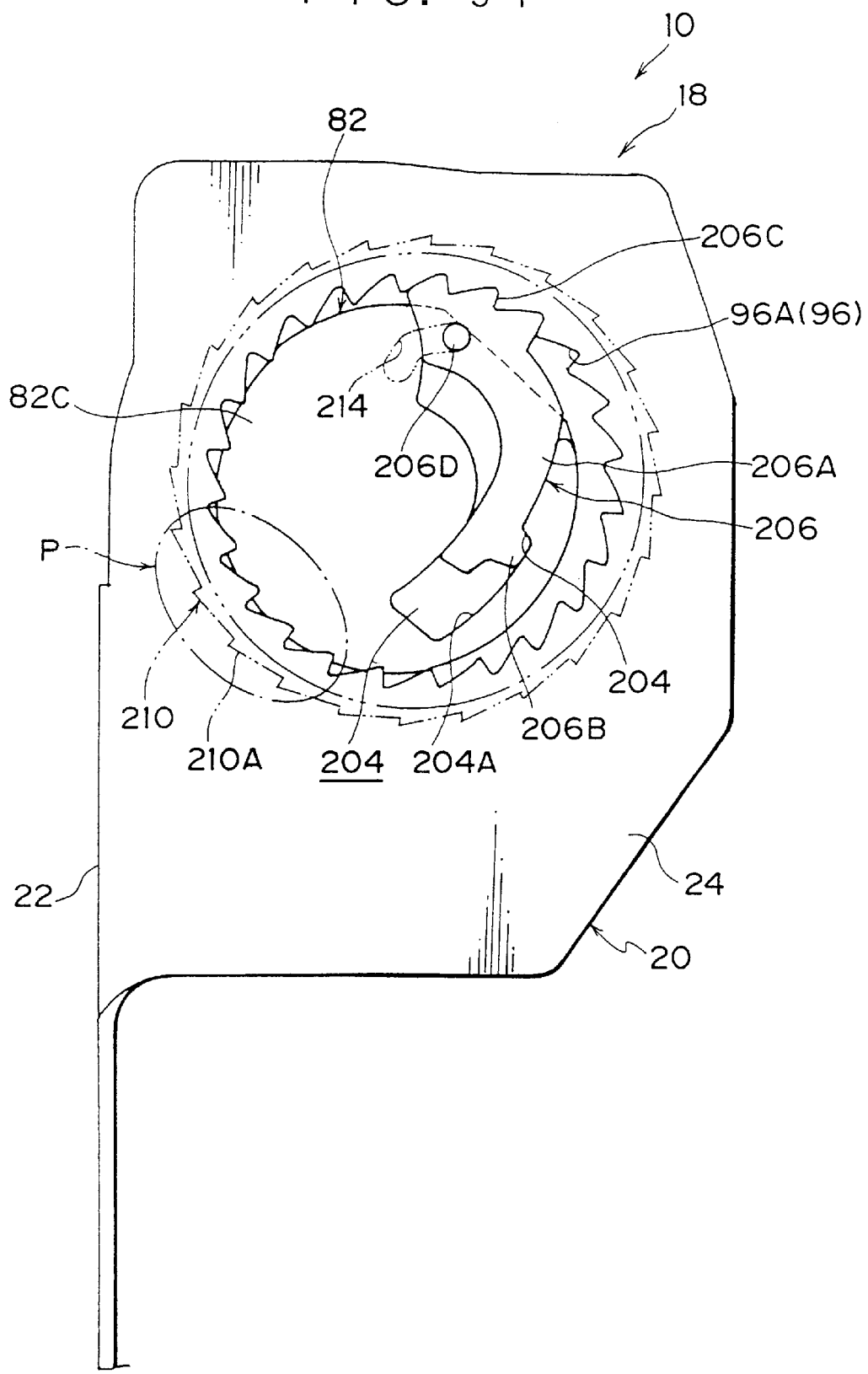
FIG. 31 is a side view showing the locked state of a webbing retractor according to the embodiment of the present invention.

On the other hand, the occupant's body, which tends to move towards the front of the vehicle due to inertia at the time of abrupt deceleration, pulls out the wearing webbing belt. Therefore, the spool 70 attempts to rotate in the pulling-out direction due to the webbing tension applied by the occupant. Therefore, relative rotation is generated in resistance to the urging force of the compression coil spring 218 between the spool 70 tending to rotate in the pulling-out direction and the V gear 210 whose rotation in the pulling-out direction is resisted. When the relative rotation is generated between them, as seen from the comparison of FIG. 30 and FIG. 31, the guide pin 206D of the lock plate 206 held in the receiving portion 204 formed in the holding portion 82C of the lock base 82 is guided by the guide hole 214 in the V gear 210 to move outside substantially in the radial direction of the lock base 82. Thereby, the lock teeth 206C of the lock plate 206 mesh with the ratchet teeth 96A of the ratchet hole 96 provided in the leg plate 24 of the frame 20.

Moreover, when the lock teeth 206C of the lock plate 206 mesh with the ratchet teeth 96A of the ratchet hole 96, the reaction force at that time acts on the holding portion 82C of the lock base 82. This reaction force is quite large, since it is caused by meshing of the lock teeth 206C having high strength and the ratchet teeth 96A at the time of abrupt deceleration of the vehicle. Therefore, the reaction force naturally also acts on the torsion shaft 92, which penetrates through the shaft core portion of the lock base 82. Furthermore, since the tip portion 92F of the torsion shaft 92 is pivotally supported by the boss 258A of the sensor holder 258 made of resin, the reaction force acts on the boss 258A of the sensor holder 258 from the tip portion 92F of the torsion shaft 92, and elastically deforms the boss 258A of the sensor holder 258 toward the direction the reaction force operates, that is, toward the direction opposite to the engagement position of the lock plate 206. Hence, a part of the outer peripheral portion of the holding portion 82C of the lock base 82 is strongly pressed to the ratchet teeth 96A of the ratchet hole 96 in the frame 20. Since the lock base 82 is produced by means of die-casting, and is relatively soft, when it is pressed against the ratchet teeth 96A, it is plastically deformed to thereby dig into the ratchet teeth 96A and is directly engaged therewith. As a result, according to this embodiment, the lock state can be obtained in two places opposite to each other in the radial direction. Hence, sufficient lock strength can be secured.

Next is a description of the operation and effect of this embodiment, from the standpoint of assembly of the webbing retractor 10.

With this embodiment, in the normal pulling-out state, the V gear 210 follows the rotation of the spool 70, and in the locked state of the V gear 210, a compression coil spring 218 is adopted as means for relatively rotating the V gear 210 with respect to the spool 70. Below is a description of a procedure of the assembly operation of the compression coil spring 218 at the time of assembling the webbing retractor 10.

As shown in FIG. 29, with this webbing retractor 10, in the state that the lock base 82, the lock cover 208 and the V gear 210 are assembled, the other end portion in the axial direction of the compression coil spring 218 is first inserted into the inside of the spring receiving portion 234 via the insertion hole 216 formed in the V gear 210, and the other end portion in the axial direction of the compression coil spring 218 is made to abut against the wall portion 238.

In this state, pressing force is applied to the one end portion in the axial direction of the compression coil spring 218 to compress the compression coil spring 218. When the compression coil spring 218 is compressed to a degree in which the one end portion in the axial direction of the compression coil spring 218 can pass through the insertion hole 216, the one end portion in the axial direction of the compression coil spring 218 is inserted from the insertion hole 216 into the spring receiving portion 234. When the application of the pressing force on the compression coil spring 218 is released in a state in which the one end portion in the axial direction of the compression coil spring 218 is received in the spring receiving portion 234, the compression coil spring 218 stretches by its own elasticity so as to restore its natural length, and abuts against the wall portion 220 structuring the spring box 228. Thus, the assembly of the compression coil spring 218 is completed.

The displacement of the compression coil spring 218 assembled as described above along the axial direction of the spool 70 is restrained by the bottom portion of the restriction wall 226, the spring receiving portion 234, and the V gear 210, and the displacement of the compression coil spring 218 along the width direction of the insertion hole 216 is restrained by the restriction walls 222, 224, 240 and 242. Therefore, poor operation or the like dose not occur due to inadvertent displacement of the compression coil spring 218.

Moreover, with this webbing retractor 10, since restriction walls 222, 224, 240 and 242 restrict the displacement of the compression coil spring 218 on the both ends of the compression coil spring 218, the both ends of the compression coil spring 218 are maintained in a stable condition. Furthermore, since a boss is unnecessary in contrast to the conventional assembly methods for the compression coil spring, among the openings (corresponding to the insertion hole 216 in this webbing retractor 10) for the compression coil spring for conventional methods, a portion corresponding to the length from the bottom end portion to the distal end portion of the boss is not required. Therefore, the size of the insertion hole 216 in the longitudinal direction can be made small. Hence, the compression coil spring 218 can be reliably prevented from deviating or coming off from the insertion hole 216.

Moreover, as described above in the assembly procedure, the compression of the compression coil spring 218 at the time of assembly is performed in the state in which the other end portion in the axial direction of the compression coil spring 218 is made to abut against the wall portion 238. Therefore, the compression coil spring 218 can be compressed simply by applying the pressing force from the one end portion in the axial direction of the compression coil spring 218, and a special support is not necessary at the other end portion in the axial direction of the compression coil spring 218.

Therefore, assembly of the compression coil spring 218 can be easily performed, and compression of the compression coil spring 218 is possible simply by applying the pressing force from the one end portion in the axial direction of the compression coil spring 218. Hence, automation of the assembly process using a robot or the like becomes possible.

Next is a description of assembly of the urging section 16 side. When the urging section 16 side is assembled, the cover 172 is adjusted to a predetermined position of the cover attachment board 178 in order to fix the cover 172 to the cover attachment board 178, and insert the engagement pawl 186 of the cover 172 in the hole portion 180 of the cover attachment board 178. As a result, the engagement pawl 186 enters, while pushing aside (bending) the pawl portion 184 of the folding member 182. When the side 172A of the cover 172 abuts against the attachment face 178A of the cover attachment board 178, since the hole portion 192 is located in a position facing the pawl portion 184, the pawl portion 184 of the folding member 182 enters the hole portion 192. At this time, since the engagement pawl 186 bent by being inserted into the hole portion 180 tends to return to its original posture, the engagement pawl 186 engages with the pawl portion 184, to thereby fix the cover 172 on the cover attachment board 178.

As described above, simply by inserting the engagement pawl 186 of the cover 172 into the hole portion 180 of the cover attachment board 178, the pawl portion 184 engages with the hole portion 192, and the cover 172 is fixed in a predetermined position on the cover attachment board 178. Therefore, assembly process of the cover 172 of the urging section 16 side can be simplified.

Moreover, since the engagement pawl 186 is constantly urged upward by restoration force due to the flexure (elastic) deformation of the deforming portion 188, the pawl portion 184 that has entered the hole portion 192 dose not become separated. That is, the cover 172 can be reliably prevented from rattling.

As described above, with this webbing retractor 10, assembly propertries of the apparatus on the lock device 18 side and the urging section 16 side can be improved. Hence, the production costs of the webbing retractor 10 can be reduced.

As described above, an advantage of the webbing retractor according to the present invention is that the pretensioner and the lock device can be made small, and further the number of parts can be reduced, enabling cost reduction.

What is claimed is:

1. A webbing retractor for use with a webbing belt having opposite ends, the webbing retractor comprising:
   a cylindrical take-up shaft at which one end of a webbing belt is retained;
   a lock device for restricting rotation of said take-up shaft in a direction for pulling out the webbing belt, during abrupt deceleration of a vehicle; and
   a pretensioner for forcibly rotating said take-up shaft in the take-up direction opposite to the pulling-out direction during abrupt deceleration of the vehicle;
   wherein said lock device includes:
      a frame having a pair of leg plates opposite to each other along an axial direction of the take-up shaft, one of the pair of leg plates being formed with a ratchet hole whose inner peripheral portion serves as internal ratchet teeth, the leg plates having sides;
      a lock base provided coaxially and relatively rotatable with respect to said take-up shaft, in a vicinity of said one of the pair of leg plates;
      a lock plate having external teeth meshable with said ratchet teeth, which is substantially integrally held by the lock base, and which restricts rotation of said lock base in said pulling-out direction by meshing of the external teeth with said ratchet teeth;
      a torsion shaft having opposite ends, provided in said take-up shaft coaxially with said take-up shaft, one end of the torsion shaft being coupled to said take-up shaft, the other end being coupled to said lock base, for integrally rotating said take-up shaft and said lock base, and allowing rotation of said take-up shaft relative to said lock base due to torsion deformation of the torsion shaft; and
      a lock cover formed with a push nut portion with which a distal end portion of said torsion shaft is engaged, a hook portion with which said lock base is engaged, and an outer peripheral flange portion overlapping said frame, for pinching said one leg plate between one end portion of the take-up shaft and said lock cover and covering said lock base and said lock plate, and
   wherein the pretensioner includes:
      a pinion provided coaxially with respect to said take-up shaft at the side of the other leg plate of said pair of leg plates and coupled directly or indirectly to said take-up shaft;
      a piston having an end portion, on which a rack bar meshable with said pinion is formed in an axial direction;
      a cylinder having a bottom portion and an end opening in an axial direction of said piston serves, for housing said piston and driving said piston with increase in internal pressure;
      a gas generator for supplying gas between the bottom portion of said cylinder and said piston during abrupt deceleration of the vehicle;
      a bearing portion facing an outer peripheral portion of a shaft portion provided coaxially with said pinion on said take-up shaft side of said pinion in a radial direction of the pinion, and having an inner peripheral portion such that a predetermined gap exists between the outer peripheral portion of said shaft portion and the inner peripheral portion; and
      a plurality of protrusions which are formed to protrude from one having a lower rigidity towards the other having a higher rigidity, of the inner peripheral portion of said bearing portion and the outer peripheral portion of said shaft portion, to thereby be brought into contact with the one having the higher rigidity, said webbing retractor further including:
         an acceleration sensor for detecting a change in acceleration during abrupt deceleration of the vehicle, and for causing the external teeth of said lock plate to mesh with said internal ratchet teeth, upon detection of said change in acceleration; and
         urging means provided at the side of the other leg plate of said frame, for urging said take-up shaft in the rotational direction for taking up said webbing belt.

2. A webbing retractor according to claim 1, wherein said pretensioner includes a cover for covering said pinion and said rack bar from a side opposite the other leg plate with respect to said pinion and said rack bar, the cover being formed with a bearing hole for pivotally supporting said pinion, a stopper facing said rack bar at the side in the driving direction of said piston due to increase in the internal pressure of said cylinder, and a restricting portion at the side opposite to said pinion with respect to said rack bar,
   wherein a peripheral portion of said bearing hole, said stopper and said restricting portion of said cover are formed of metal, and the remaining portion of said cover is formed of synthetic resin material.

3. A webbing retractor according to claim 2, wherein said protrusions are formed on said bearing portion, and said protrusions formed in a vicinity of a portion facing said shaft portion along a pressing direction of said rack bar against said pinion are more numerous in number than said protrusions formed in another portion of said bearing portion.

4. A webbing retractor according to claim 3, wherein said protrusions are brought into linear contact with one of the inner peripheral portion of said bearing portion and the outer peripheral portion of said shaft portion, with one of these being without said protrusions formed thereon.

5. A webbing retractor according to claim 4, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:
an inertial mass body which moves due to change in acceleration during abrupt deceleration of the vehicle; and
a restriction member which is displaced according to movement of said inertial mass body and is engaged with the V gear due to said displacement, to thereby restrict rotation of said V gear.

6. A webbing retractor according to claim 5, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

7. A webbing retractor according to claim 2, wherein said protrusions are formed in said bearing portion, in the opposite side of said rack bar with respect to said pinion, and on the inner peripheral portion of said bearing portion facing the outer peripheral portion of said shaft portion along the direction of the meshing face of said rack bar and said pinion.

8. A webbing retractor according to claim 7, wherein said protrusions are brought into linear contact with one of the inner peripheral portion of said bearing portion and the outer peripheral portion of said shaft portion, with one of these being without said protrusions formed thereon.

9. A webbing retractor according to claim 8, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:
an inertial mass body which moves due to change in acceleration during abrupt deceleration of the vehicle; and
a restriction member which is displaced according to movement of said inertial mass body and is engaged with the V gear due to said displacement, to thereby restrict rotation of said V gear.

10. A webbing retractor according to claim 9, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

11. A webbing retractor according to claim 1, wherein said protrusions are formed on said bearing portion, and said protrusions formed in a vicinity of a portion facing said shaft portion along a pressing direction of said rack bar against said pinion are more numerous in number than said protrusions formed in another portion of said bearing portion.

12. A webbing retractor according to claim 11, wherein said protrusions are brought into linear contact with one of the inner peripheral portion of said bearing portion and the outer peripheral portion of said shaft portion, with one of these being without said protrusions formed thereon.

13. A webbing retractor according to claim 12, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:
an inertial mass body which moves due to change in acceleration during abrupt deceleration of the vehicle; and
a restriction member which is displaced according to movement of said inertial mass body and is engaged with the V gear due to said displacement, to thereby restrict rotation of said V gear.

14. A webbing retractor according to claim 13, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

15. A webbing retractor according to claim 1, wherein said protrusions are formed in said bearing portion, in the opposite side of said rack bar with respect to said pinion, and on the inner peripheral portion of said bearing portion facing the outer peripheral portion of said shaft portion along the direction of the meshing face of said rack bar and said pinion.

16. A webbing retractor according to claim 15, wherein said protrusions are brought into linear contact with one of the inner peripheral portion of said bearing portion and the outer peripheral portion of said shaft portion, with one of these being without said protrusions formed thereon.

17. A webbing retractor according to claim 16, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:
an inertial mass body which moves due to change in acceleration during abrupt deceleration of the vehicle; and
a restriction member which is displaced according to movement, of said inertial mass body and is engaged with the V gear due to said displacement, to thereby restrict rotation of said V gear.

18. A webbing retractor according to claim 17, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

19. A webbing retractor according to claim 1, wherein said protrusions are brought into linear contact with one of the inner peripheral portion of said bearing portion and the outer peripheral portion of said shaft portion, with one of these being without said protrusions formed thereon.

20. A webbing retractor according to claim 19, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:

an inertial mass body which moves due to change in acceleration during abrupt deceleration of the vehicle; and a restriction member which is displaced according to movement, of said inertial mass body and is engaged with the V gear due to said displacement, to thereby restrict rotation of said V gear.

21. A webbing retractor according to claim 20, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

22. A webbing retractor according to claim 1, wherein said lock device includes a V gear provided coaxially and relatively rotatable with respect to said lock base, meshing with said lock plate, which displaces said lock plate by relative rotation to thereby cause said external teeth to mesh with said ratchet teeth;

wherein said acceleration sensor includes:

an inertial mass body which moves due to change in acceleration during abrupt deceleration of the vehicle; and a restriction member which is displaced according to movement of said inertial mass body and is engaged with the V gear due to said displacement, to thereby restrict rotation of said V gear.

23. A webbing retractor according to claim 22, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

24. A webbing retractor according to claim 1, wherein said urging means includes a spiral coil spring having opposite ends, with one end engaged directly or indirectly with said take-up shaft and the other end directly or indirectly engaged with the other leg plate of said frame, and urging said take-up shaft in a rotational direction for taking up said webbing belt due to rotation of the other end of the spring with respect to the one end of the spring in the direction of increasing the number of windings.

* * * * *